US012570364B2

(12) United States Patent (10) Patent No.: US 12,570,364 B2
Hung et al. (45) Date of Patent: Mar. 10, 2026

(54) ACTIVE AIR DAM SYSTEM WITH OBJECT IMPACT DAMAGE CONTROL

(71) Applicant: VENTRA GROUP, CO., Halifax (CA)

(72) Inventors: Joaquin Hung, Markham (CA); Steven Perucca, Clinton Township, MI (US)

(73) Assignee: VENTRA GROUP CO., Nova Scotia (CA)

( * ) Notice: Subject to any disclaimer, the term of this patent is extended or adjusted under 35 U.S.C. 154(b) by 606 days.

(21) Appl. No.: 18/073,220

(22) Filed: Dec. 1, 2022

(65) Prior Publication Data

US 2023/0174171 A1     Jun. 8, 2023

Related U.S. Application Data

(60) Provisional application No. 63/285,396, filed on Dec. 2, 2021.

(51) Int. Cl.
  B62D 35/00     (2006.01)
  B62D 35/02     (2006.01)
(52) U.S. Cl.
  CPC ........... B62D 35/005 (2013.01); B62D 35/02 (2013.01)
(58) Field of Classification Search
  CPC .............................. B62D 35/005; B62D 35/02
  USPC ............................ 296/180.1, 108, 0.2, 180.3
  See application file for complete search history.

(56) References Cited

U.S. PATENT DOCUMENTS 8,807,629 B2     8/2014  Benvenuto et al.
9,039,068 B2     5/2015  Niemi et al.

9,764,706 B2     9/2017   Benvenuto et al.
9,950,754 B2 *   4/2018   Povinelli ................ B62D 35/02
10,017,048 B2    7/2018   Manhire
10,124,839 B2 *  11/2018  Povinelli ................ B62D 35/02
10,384,730 B2    8/2019   Klop et al.
10,787,141 B2    9/2020   Vacca et al.
    (Continued)

FOREIGN PATENT DOCUMENTS

DE      102009052372 A1     5/2011
DE      102018004361 A1     12/2019
    (Continued)

OTHER PUBLICATIONS

Extended European Search Report dated Mar. 27, 2025, issued in corresponding European Patent Application No. 24205255.3 (8 pgs.).

*Primary Examiner* — Jason S Daniels
(74) *Attorney, Agent, or Firm* — Pillsbury Winthrop Shaw Pittman, LLP

(57)                ABSTRACT

An active air dam system with a mounting bracket for mounting beneath the vehicle; a linkage having an air dam mounting portion; and an air dam. The linkage moves between stored and deployed positions. The air dam is connected by a pivotal connector and a selectively releasable connector, which cooperate to maintain a fixed relationship between the air dam and the air dam mounting portion. The connector releases its connection in response to a force exceeding a threshold, thus enabling the air dam striking an object in an active position thereof to pivot rearwardly. The system may have a biasing structure for biasing the air dam forwardly about the pivotal connector, thus enabling the air dam when striking an object in the active position thereof to pivot rearwardly and return pivoting forwardly.

30 Claims, 33 Drawing Sheets

(56)                    References Cited

U.S. PATENT DOCUMENTS

| 10,900,409 | B2 | 1/2021 | Clapie et al. | |
| 10,953,933 | B2 * | 3/2021 | Schmitt | B62D 35/005 |
| 11,072,378 | B2 | 7/2021 | Klob et al. | |
| 11,155,312 | B2 * | 10/2021 | Shiga | B62D 37/02 |
| 11,161,556 | B2 * | 11/2021 | Zhang | B62D 37/02 |
| 11,390,334 | B2 * | 7/2022 | Salter | B62D 37/02 |
| 11,772,720 | B2 * | 10/2023 | Sargent | B62D 35/02 |
| | | | | 296/180.5 |
| 11,851,112 | B2 * | 12/2023 | Grebel | B62D 35/00 |
| 2013/0223980 | A1 | 8/2013 | Pastrick et al. | |
| 2021/0061373 | A1 | 3/2021 | Guyon | |
| 2023/0174171 | A1 | 6/2023 | Hung et al. | |

FOREIGN PATENT DOCUMENTS

| DE | 102020108797 | A1 | 10/2020 |
| EP | 3638531 | B1 | 8/2021 |

* cited by examiner

Section A-A

Section A-A

Section A-A

ACTIVE AIR DAM SYSTEM WITH OBJECT IMPACT DAMAGE CONTROL

CROSS-REFERENCE TO RELATED APPLICATIONS

This application claims priority to U.S. Provisional Patent Application No. 63/285,396, filed Dec. 2, 2022, the subject matter of which is incorporated herein by reference in its entirety.

FIELD OF THE INVENTION

The present invention relates to an active air dam system, and particularly an active air dam system with one or more features for addressing object impact.

BACKGROUND OF THE INVENTION

Many conventional motor vehicles, such as the modern day automobile include an air dam that is engineered to improve the aerodynamic characteristics of the vehicle body. A traditional air dam, which is sometimes referred to as an air deflector, is mounted on the underside of the front-end structure of the vehicle body, extending downward into proximity with the roadway. Air dams improve the handling and control of the motor vehicle, increase fuel economy, and/or also improve the routing of air flow for cooling/heat exchange in the vehicle powertrain and air conditioning systems by managing the flow of turbulent air under and around the vehicle chassis and affecting internal flows.

As a vehicle moves forward at higher speeds, air flow underneath the vehicle is more likely to increase where a vehicle does not have an air dam. Air flow underneath a vehicle is not desirable because a vehicle may experience lift as well as air turbulence under the vehicle, thereby reducing fuel efficiency and increasing aerodynamic drag.

Some air dams are generally fixedly suspended from underneath the front end structure of the vehicle. Air dams therefore redirect the air flow to the sides of the vehicle so as to minimize turbulence caused by irregular undercarriage surfaces. However, such traditional air dams which are fixedly suspended from underneath the front end structure may be damaged upon sporadic unintended impact with a curb, driveway, incline or other roadway obstruction.

Other air dams are extendible under power, and in some vehicles a control system in the vehicle may deploy the air dam when the vehicle is above a certain speed. This is advantageous because air flow issues are less of a concern at low speeds, and hence the air dam's deployment is used at a time when it is most effective from an aerodynamic standpoint. Also, at higher speeds, the vehicle is less likely to encounter common obstacles such as curbs, parking blocks, and the like that vehicles often encounter at low speeds, particularly on start up when the vehicle is being moved in a parking spot or driveway. Hence, the ability to keep the air dam undeployed or retracted at initial low speeds can avoid damage from objects at the start of a vehicle drive. However, after air dam deployment, the driver may still encounter objects on the road that are smaller than the undercarriage height, but high enough to strike the air dam and cause potential damage. Moreover, even in systems where the air dam is deployed at a higher speed, it is possible the control system may be designed to have the air dam remain deployed for the rest of the drive trip, or remain deployed for some period of time even after speed is reduced, as that would avoid or reduce the action of repeating the deployment cycle after common short-lived low speed situations like stop lights, slowing down for intersections, slowing for traffic and the like. Thus, because the air dam can remain deployed, it may remain deployed when the driver reaches a trip end and is parking the vehicle, which again creates the common situation of encountering obstacles like curbs, etc. that may strike the air dam. As such, the ability to retract the air dam to a storage position does not address impact situations that occur while the air dam is deployed.

Damage to the air dam from striking obstacles is undesirable. Moreover, the force of the object strike can be transferred to the linkage that moves the air dam between the storage and deployed positions. A dented or bent air dam itself is undesirable, but may still be able to function for directing airflow to some extent. However, a damaged linkage system may render the air dam partially or entirely inoperable, and is more expensive to repair.

U.S. Pat. No. 9,764,706 (the entirety of which is incorporated herein by reference) discloses an air dam system design in which a spring absorbs movement of the linkage if the air dam strikes an object. However, the positioning of the spring is rearward and above the linkage. This leads to at least two issues. First, the packaging size is large and may not be suitable for vehicles with smaller space constraints. Second, a force applied to the air dam is still transferred to the linkage, and may stress and damage the linkage before the spring is able to absorb significant force. In particular, in the design illustrated in that patent, the bottom bar of the linkage is near horizontal and will pass through horizontal as the linkage is driven up against the spring. Thus, the force against the air dam will have a significant vector in the same direction as the lower bar, which will apply significant force to that bar and may cause damage before the spring can take up a sufficient amount of the force.

SUMMARY OF THE INVENTION

One aspect of the present application provides an active air dam system for mounting beneath a vehicle, which includes a selectively releasable connector. The system comprises a mounting bracket for mounting the system beneath the vehicle; a linkage mounted to the mounting bracket and having an air dam mounting portion at a distal end thereof; and an air dam mounted to the air dam mounting portion of the linkage. The linkage is moveable between (a) a stored position for raising the air dam upwardly towards the mounting bracket to a retracted position, and (b) a deployed position for lowering the air dam away from the mounting bracket to an active position to extend downwardly from the vehicle for deflecting air. A driver is connected to the linkage for moving the linkage under power between the stored and deployed positions. The air dam is connected to the air dam mounting portion of the linkage by a pivotal connector and a selectively releaseable connector. The pivotal connector and the selectively releaseable connector cooperate to maintain a fixed relationship between the air dam and the air dam mounting portion. The selectively releaseable connector is configured to release its connection of the air dam and the air dam mounting portion in response to a force exceeding a threshold amount being applied thereto by the air dam pivoting rearwardly relative to the air dam mounting portion about the pivotal connector, thus enabling the air dam when striking an object in the active position thereof to pivot rearwardly about the pivotal connector.

Another aspect of the present application provides an active air dam system for mounting beneath a vehicle, which includes a biasing structure. The system comprises a mounting bracket for mounting the system beneath the vehicle; a linkage mounted to the mounting bracket and having an air dam mounting portion at a distal end thereof; and an air dam mounted to the air dam mounting portion of the linkage. The linkage is moveable between (a) a stored position for raising the air dam upwardly towards the mounting bracket to a stored position, and (b) a deployed position for lowering the air dam away from the mounting bracket to an active position to extend downwardly from the vehicle for deflecting air. A driver is connected to the linkage for moving the linkage under power between the stored and deployed positions. The air dam is connected to the air dam mounting portion of the linkage by a pivotal connector. A biasing structure is positioned to bias the air dam forwardly about the pivotal connector, and is configured to enable the air dam to pivot rearwardly in response to a force applied thereto, thus enabling the air dam when striking an object in the active position thereof to pivot rearwardly about the pivotal connector and return pivoting forwardly thereafter.

Other objects, aspects and advantages of the present application will become apparent from the following detailed description, the accompanying drawings, and the appended claims.

DETAILED DESCRIPTION OF THE ILLUSTRATED EMBODIMENT(S)

Figure 1:
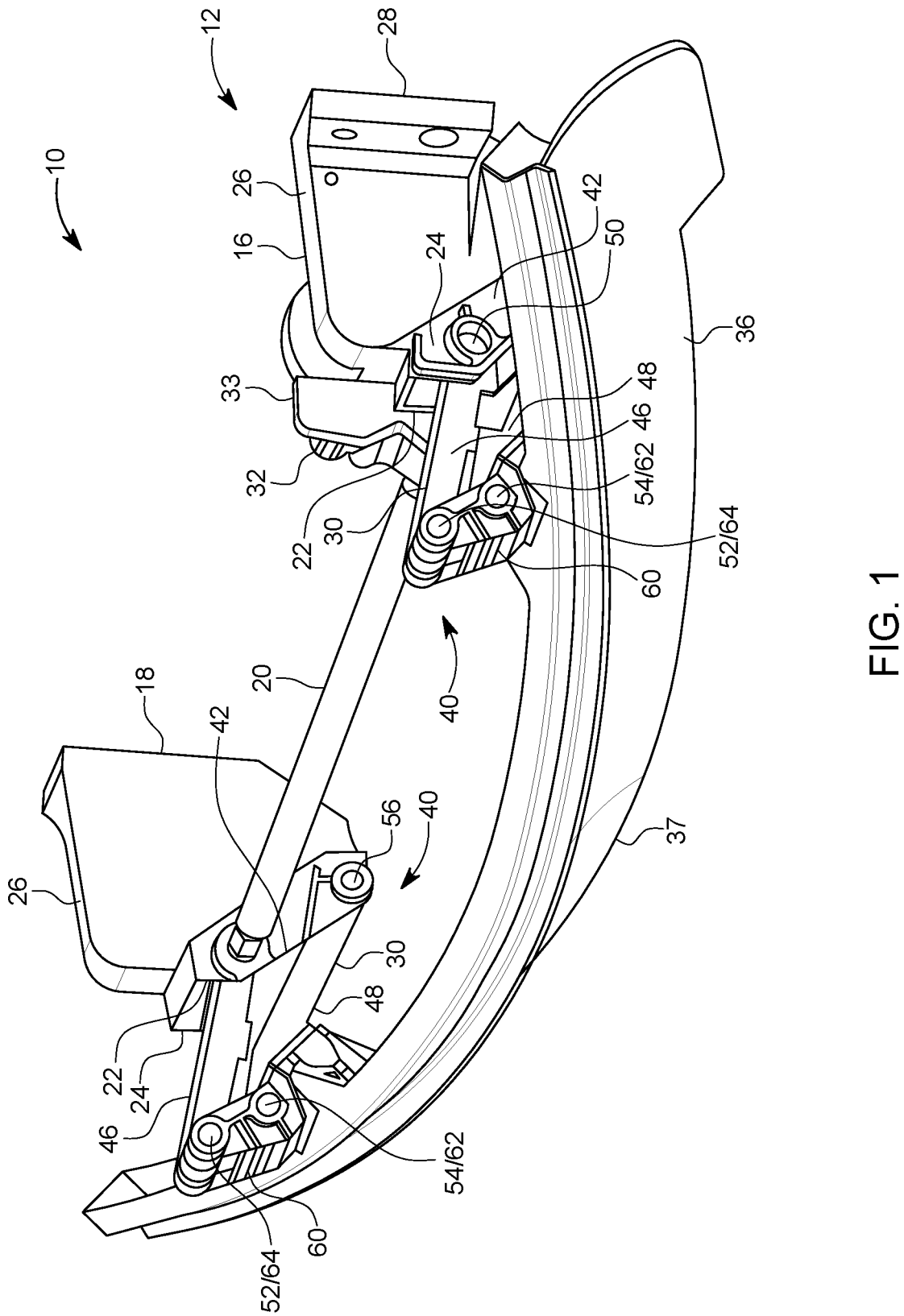
FIG. 1 is a perspective view of an air dam system in accordance with one embodiment of the invention in the stored position.

The present application discloses various embodiments of an active air dam system for mounting beneath a vehicle. As mentioned above, U.S. Pat. No. 9,764,706 (the entirety of which is incorporated herein by reference) is an example of a known air dam system, and provides the basic details already known in the art. Some aspects of the present application, such as the selectively releasable connector, may be added to such a known design or other designs, as an improvement. In other aspects, a biasing structure between the air dam and the linkage may be used in place of the biasing structure of the '706 patent to avoid the shortcomings of that patent's biasing arrangement.

FIGS. 1-10b illustrates a first embodiment of an air dam system 10. The system 10 comprises a mounting bracket 12 for mounting the system 10 beneath the vehicle. The mounting bracket 10 may have any structure or configuration. The illustrated embodiment shows a non-limiting design in which the mounting bracket 12 includes a pair of side brackets 16, 18 laterally spaced apart from one another. Each side bracket 16, 18 may be positioned at the end of a drive shaft 20. The illustrated side brackets 16, 18 are generally similar in structure with mirroring shapes, and thus will be described together with common reference numbers for common parts. Each side bracket 16, 18 in the non-limiting example has a main body 26 with a pair of mounting flanges 22, 24. The brackets 16, 18 may be formed from stamped metal, such as steel, aluminum, etc., molded from plastic, or formed in any suitable manner from any suitable material.

It should be understood that in other embodiments, the number of brackets used may be other than two. For example, three or more brackets may be used, or a single bracket, such as a bracket at the center of the air dam may be used. The illustrated design is not limiting and is simply an example.

Each bracket 16, 18 has the main wall 26 extending forwardly and an attachment flange 28 extending laterally for securement to a part of the vehicle body. The securement location may be any suitable location, and may be a cross-beam to which the bumper is attached, a forward cross-beam of the vehicle frame, or any other suitable attachment point(s) in the vehicle. The mounting flanges 22, 24 are spaced apart for receiving parts of a linkage 30 therebetween as described below.

In the illustrated embodiment, one of the side brackets 16 has a driver 32 mounted thereto for driving the drive shaft 20. The driver 32 may be an electric motor, or it may be an driver for receiving a driving input, such as a gear box or other transmission, that connects to the output drive of a power source in the vehicle, such as an electric motor. Thus, the term driver is used to reference a device that includes its power source, like a motor, or includes an input that receives driving power from a source external to the air dam system 10, such as a gear input, direct rotational drive, screw drive, etc. that couples to an output of a motor or other power system located elsewhere in the vehicle. The driver is not limited to being driven by a motor using electrical power. For example, the driver may be a fluid operated driver that is pneumatically operated, i.e., the fluid is a gas used to provide the driving force. The driver may also be hydraulically operated, i.e., the fluid is a liquid, typically an incompressible liquid such as oil, used to provide the driving force. Such fluid driven designs may use a piston, for example, that extends and retracts. The driver 32 may be mounted to an additional bracket 33, which is attached to the bracket 16. This is optional, and the driver 32 may be attached directly to the bracket 16 (as shown in later embodiments) or at any other suitable location.

Figure 8:
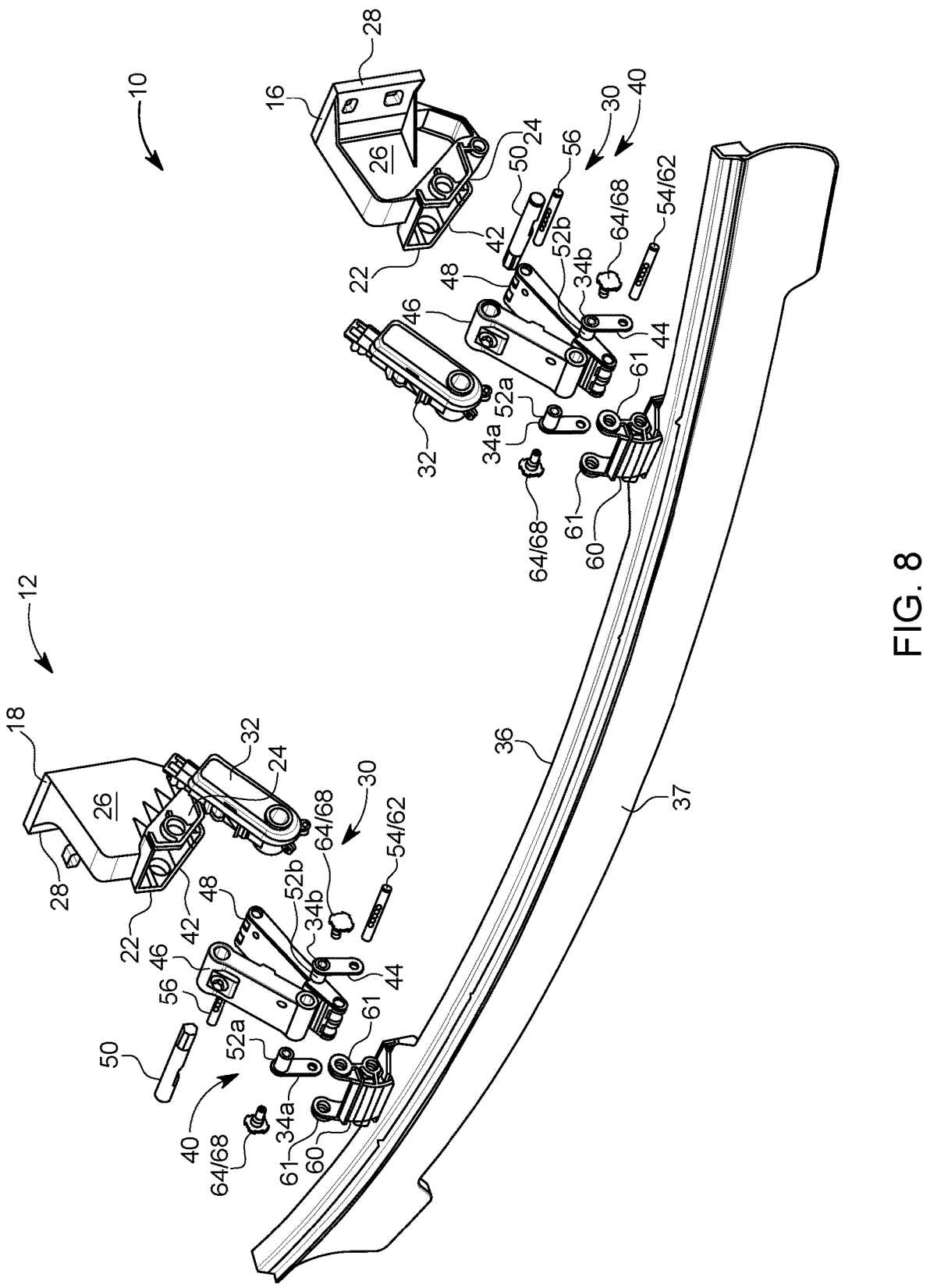
FIG. 8 is an exploded view of an embodiment like that of FIG. 1, with two drivers.
Figure 10A:
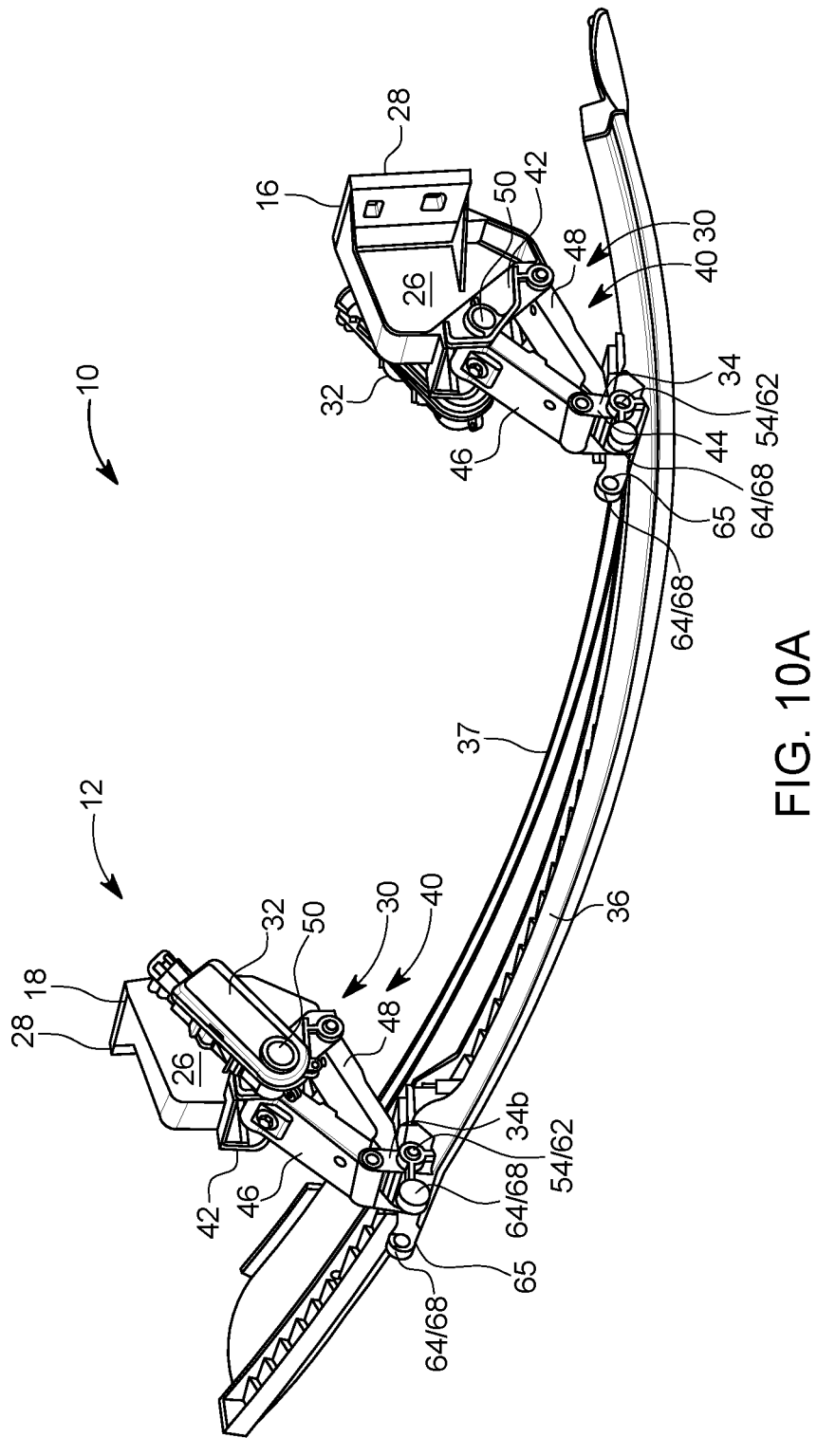
FIGS. 10a and 10b are perspective views of the system of FIG. 8 in the deployed position after release of the releasable connectors and the stored position, respectively.
Figure 10B:
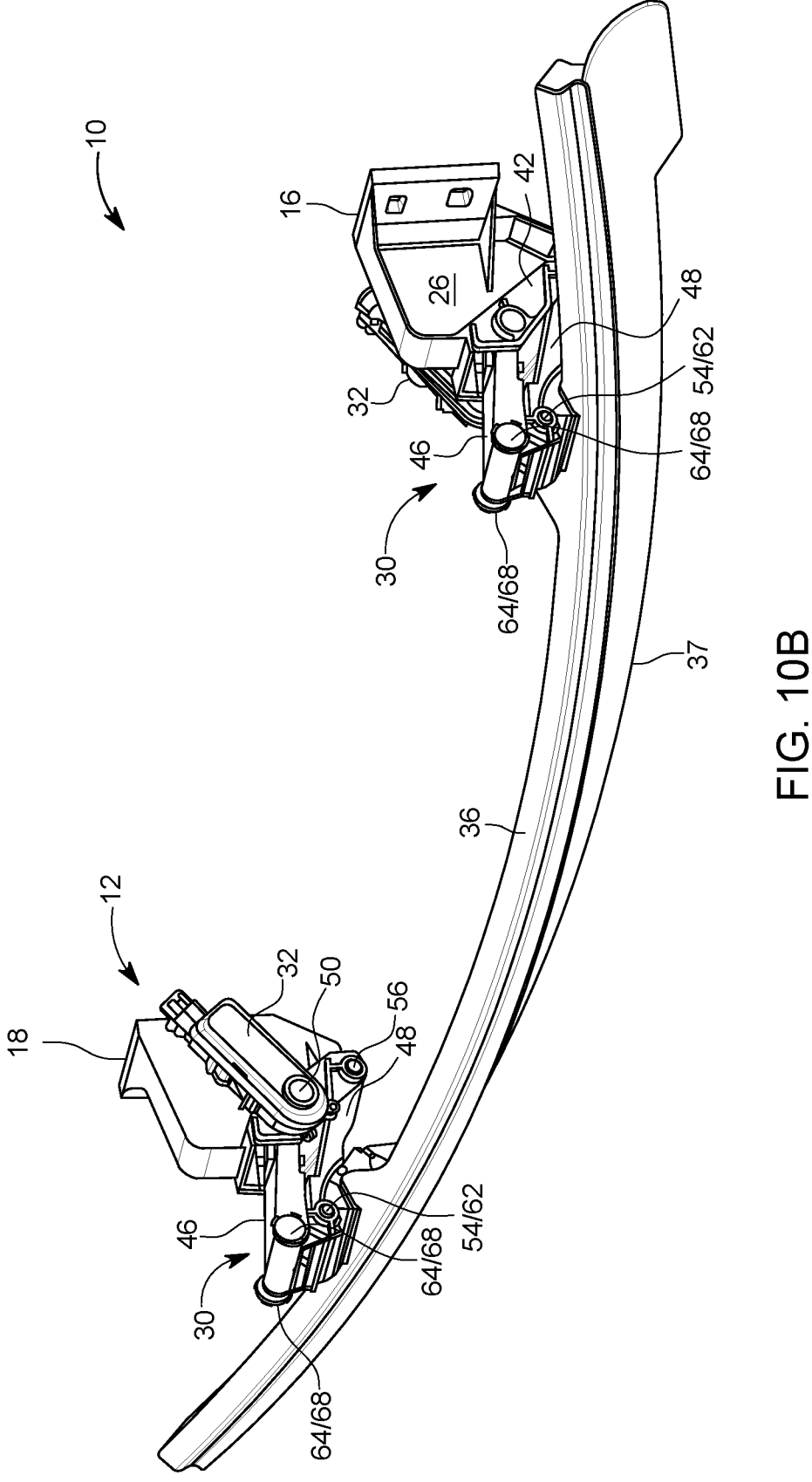
Figure 11:
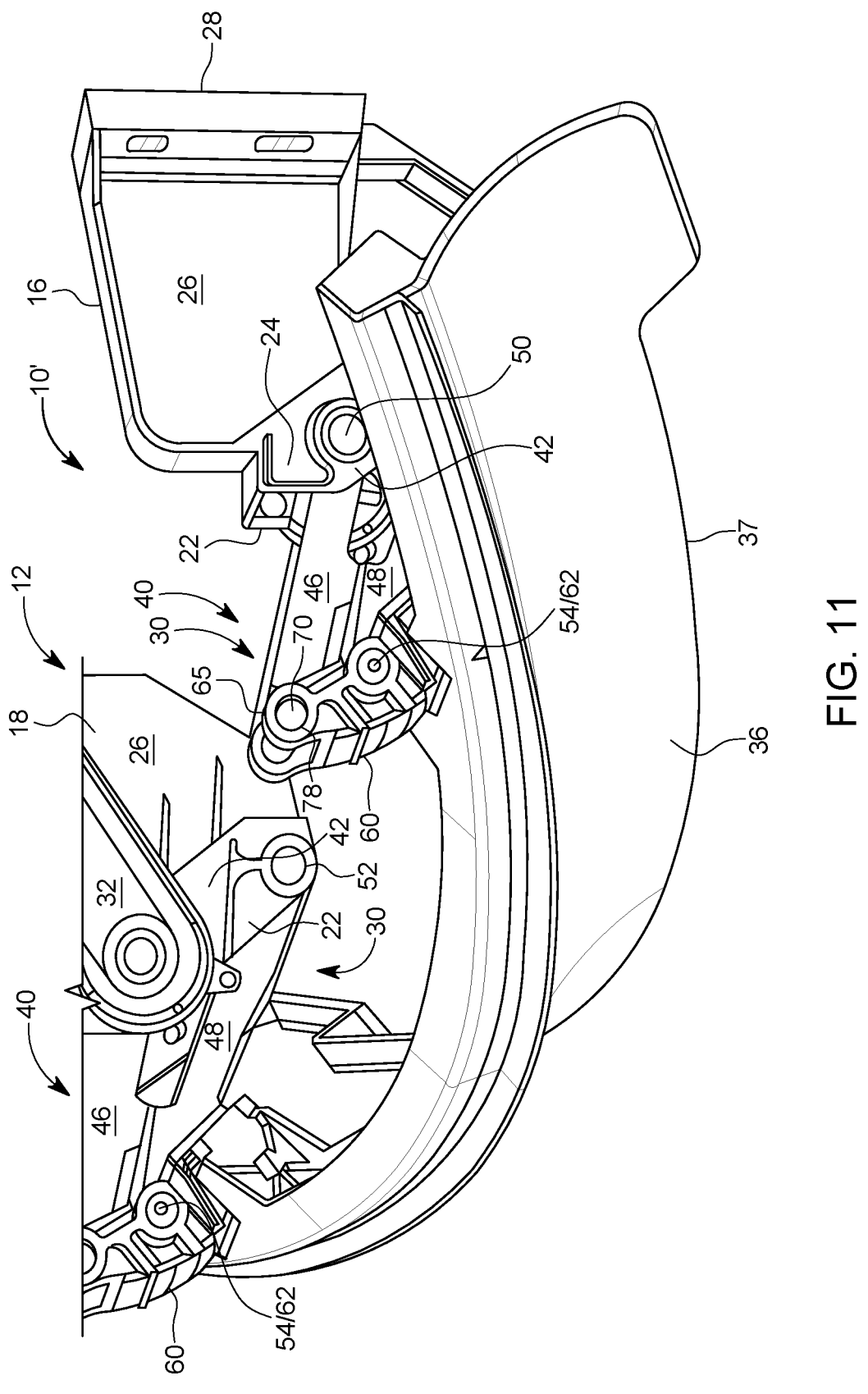
FIG. 11 is a perspective view of an air dam system in accordance with another embodiment of the invention in the stored position.
Figure 12:
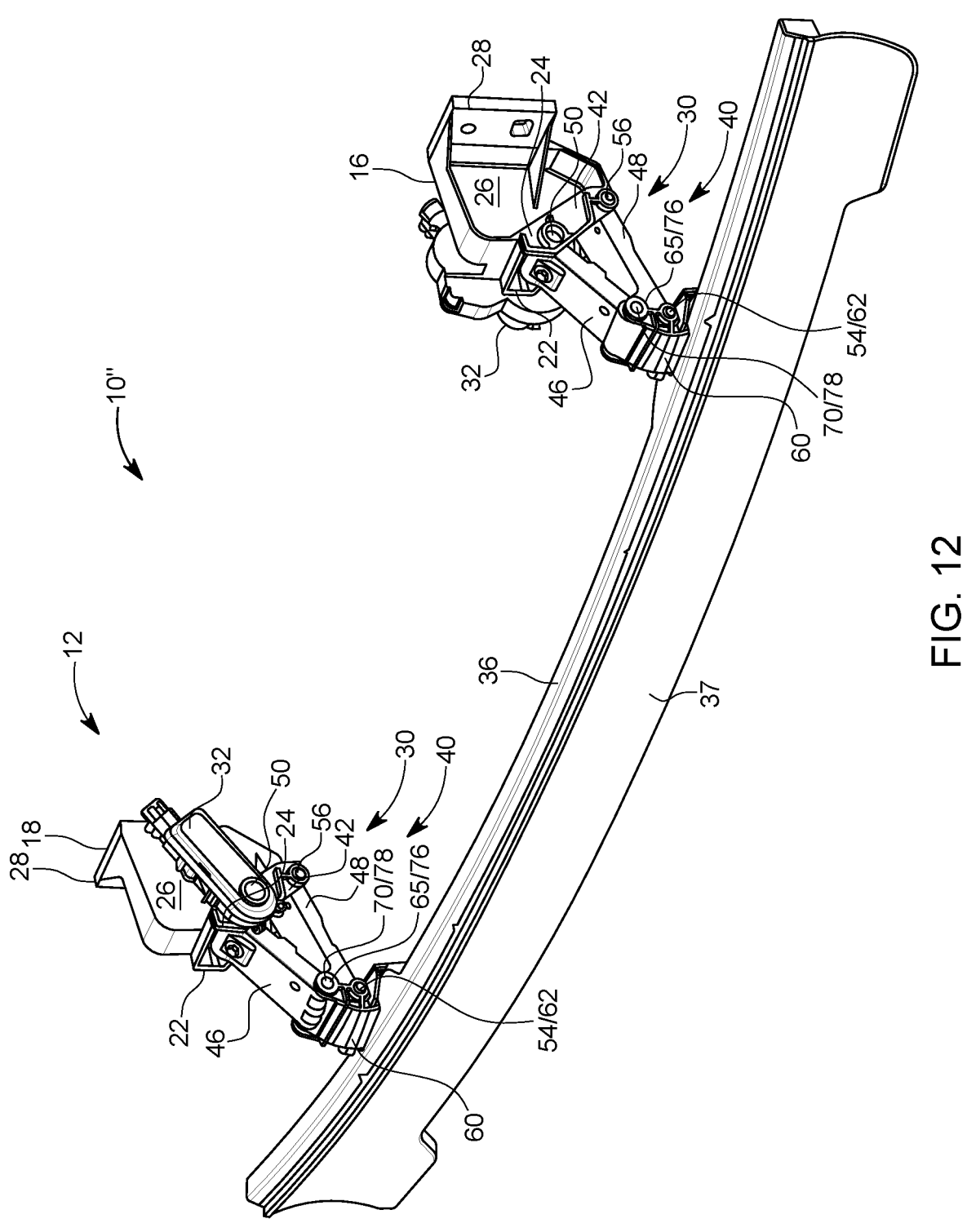
FIG. 12 is a perspective view of the air dam system of FIG. 11 in the deployed position.
Figure 13:
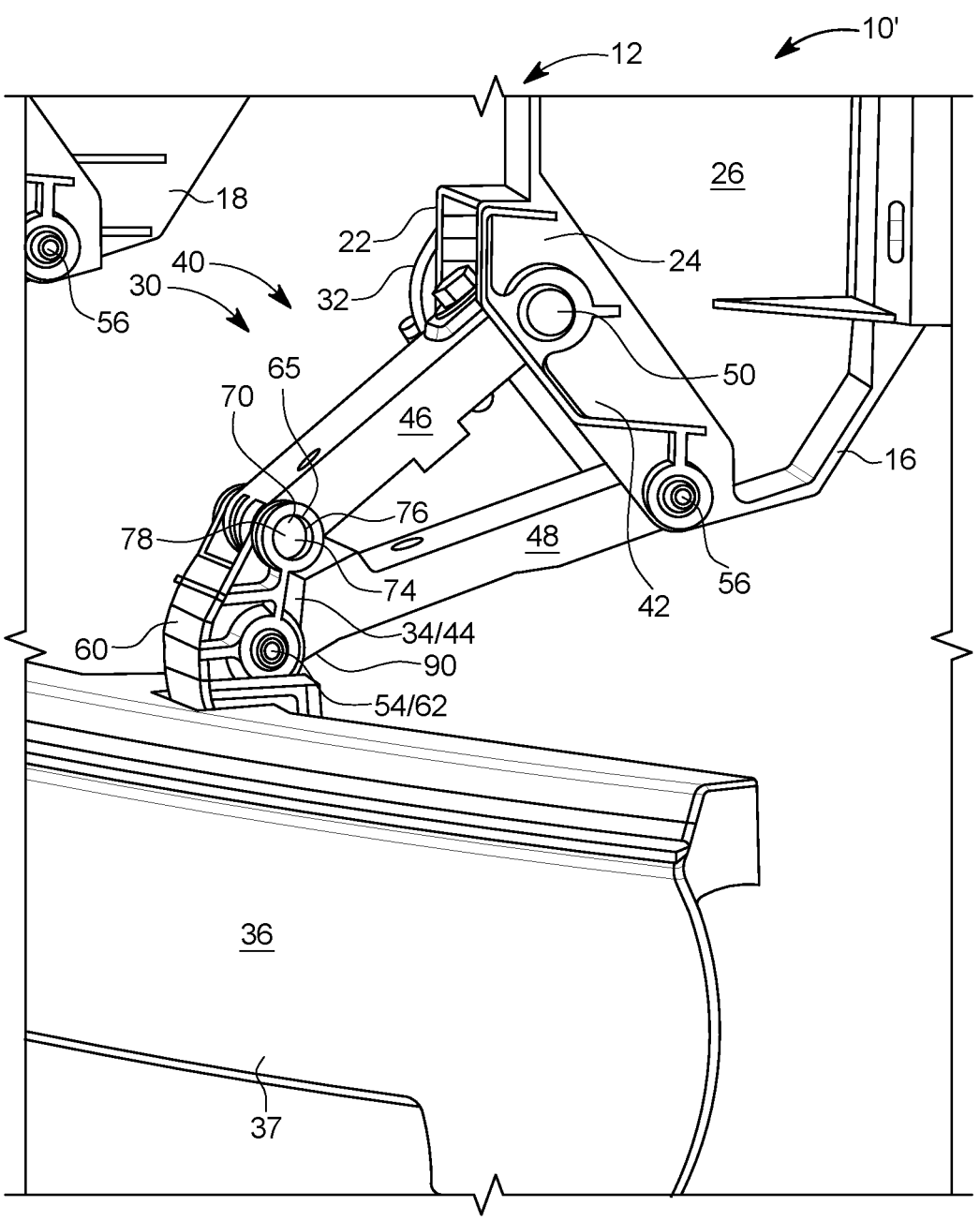
FIG. 13 is a close-up perspective view of the air dam system of FIG. 11 in the deployed position.

In the illustrated embodiment with one driver 32, the drive shaft 20 transfers rotational force to the linkage 30 on the other side bracket 18. It is also possible to have a driver 32 attached to each side brackets 16, 18 with no drive shaft therebetween (as shown in later embodiments). The drive shaft 32 may be preferred because it avoids the cost of having multiple drivers, although it is not limiting and is an optional feature. For example, in some vehicles it may instead be preferred to use individual drivers for driving each linkage 30 for space, weight, or cost reasons. FIGS. 8, 10*a* and 10*b* show an alternative version of FIG. 1 with an individual driver 32 for each bracket 16, 18. That version is labeled with reference number 10 also because the designs are the same except for the use of individual drivers 32 versus one driver 32 with a drive shaft 20.

The system 10 also includes the linkage 30, and in the illustrated embodiment there are two linkages 30. Each linkage 30 is mounted to the mounting bracket 12, and in the illustrated embodiment each is mounted to a respective side bracket 16, 18. Each linkage 30 has an air dam mounting portion 34 at a distal end thereof. The air dam mounting portion 34 is the part of the linkage 30 to which the air dam 36 is mounted. Like the number of brackets, the number of linkages 30 is also not limiting.

Figure 2:
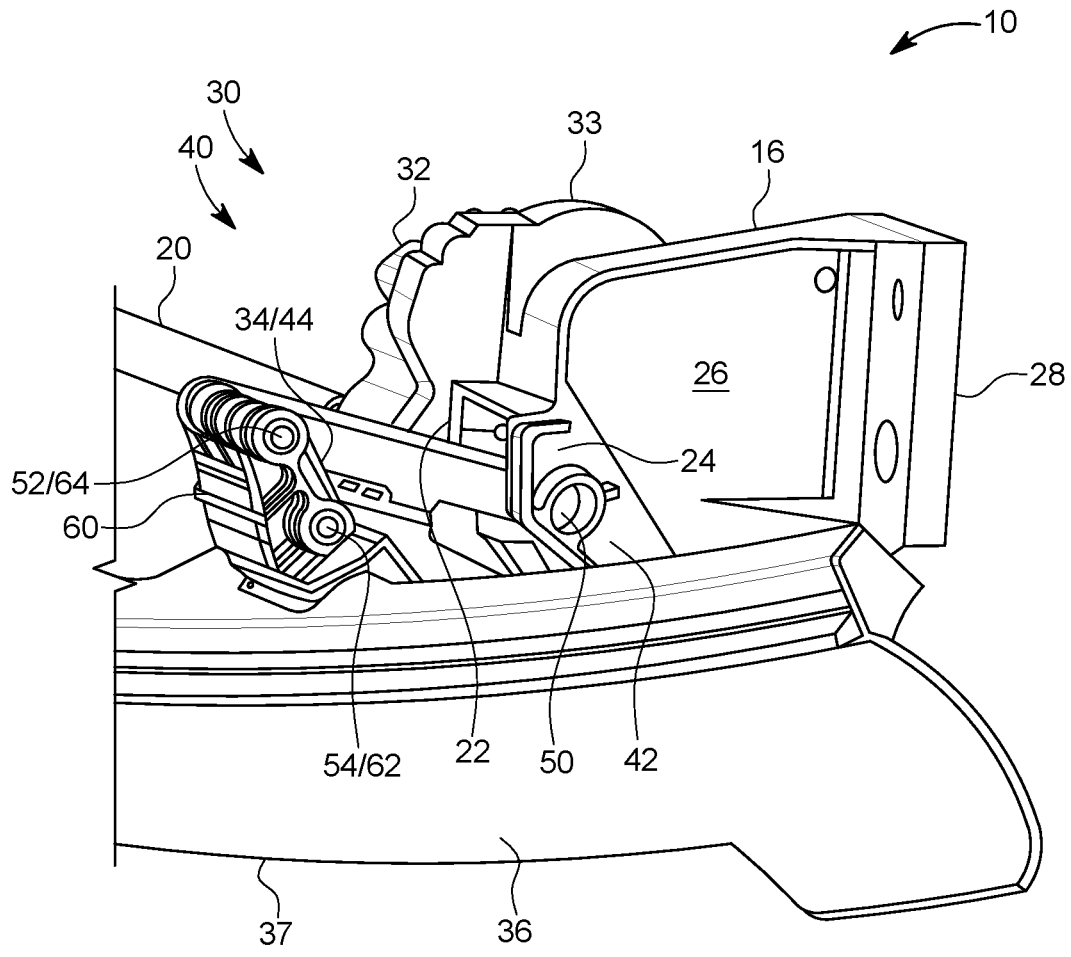
FIG. 2 is a close-up perspective view of the air dam system of FIG. 1 in the stored position.
Figure 7:
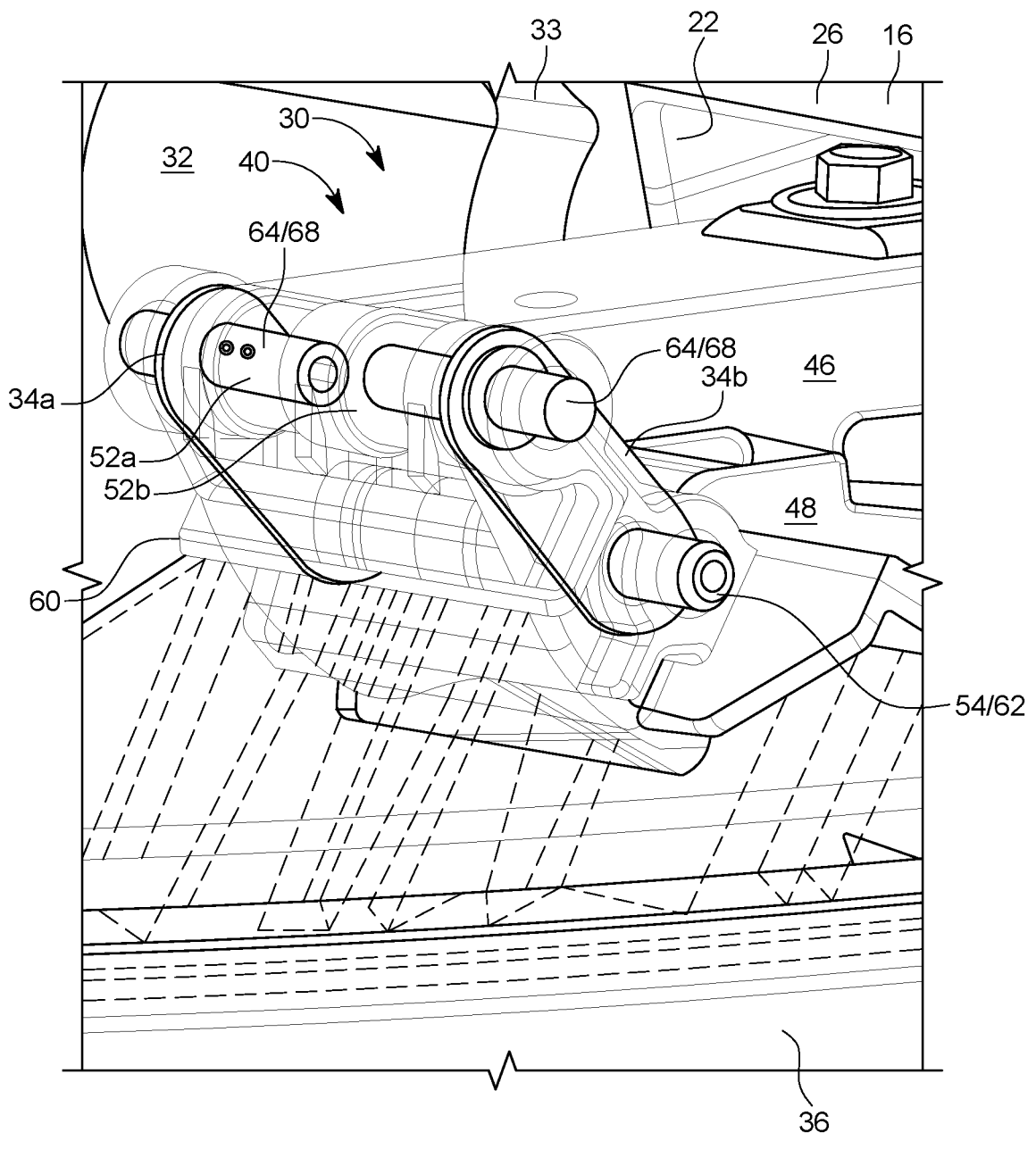
FIG. 7 is a close-up perspective view of the air dam system of FIG. 1 with some components in transparent to show elements associated with the releasable connector.

Each linkage 30 is moveable between (a) a stored position for raising the air dam 36 upwardly towards the mounting bracket 12 (including brackets 16, 18 in the illustrated embodiment) to a retracted position, and (b) a deployed position for lowering the air dam 36 away from the mounting bracket 12 to an active position to extend downwardly from the vehicle for deflecting air. FIGS. 1, 2 and 7 show the linkages 30 and the air dam 36 in the stored position, which may also be referred to as a retracted or home position. In the stored or retracted position, the air dam 36 is angled to extend rearwardly generally horizontally or closer to horizontal than the deployed position. This stored or retracted position raises the air dam 36 further away from the ground than in the deployed position, and in some designs the air dam 36 in the stored or retracted position is raised higher than the vehicle front bumper's lower edge so that it is fully within the vehicle envelope. However, in some designs the stored position may have the air dam 36 or a portion thereof lower than the bumper's lower edge, although typically that exposed part is relatively small.

Figure 3:
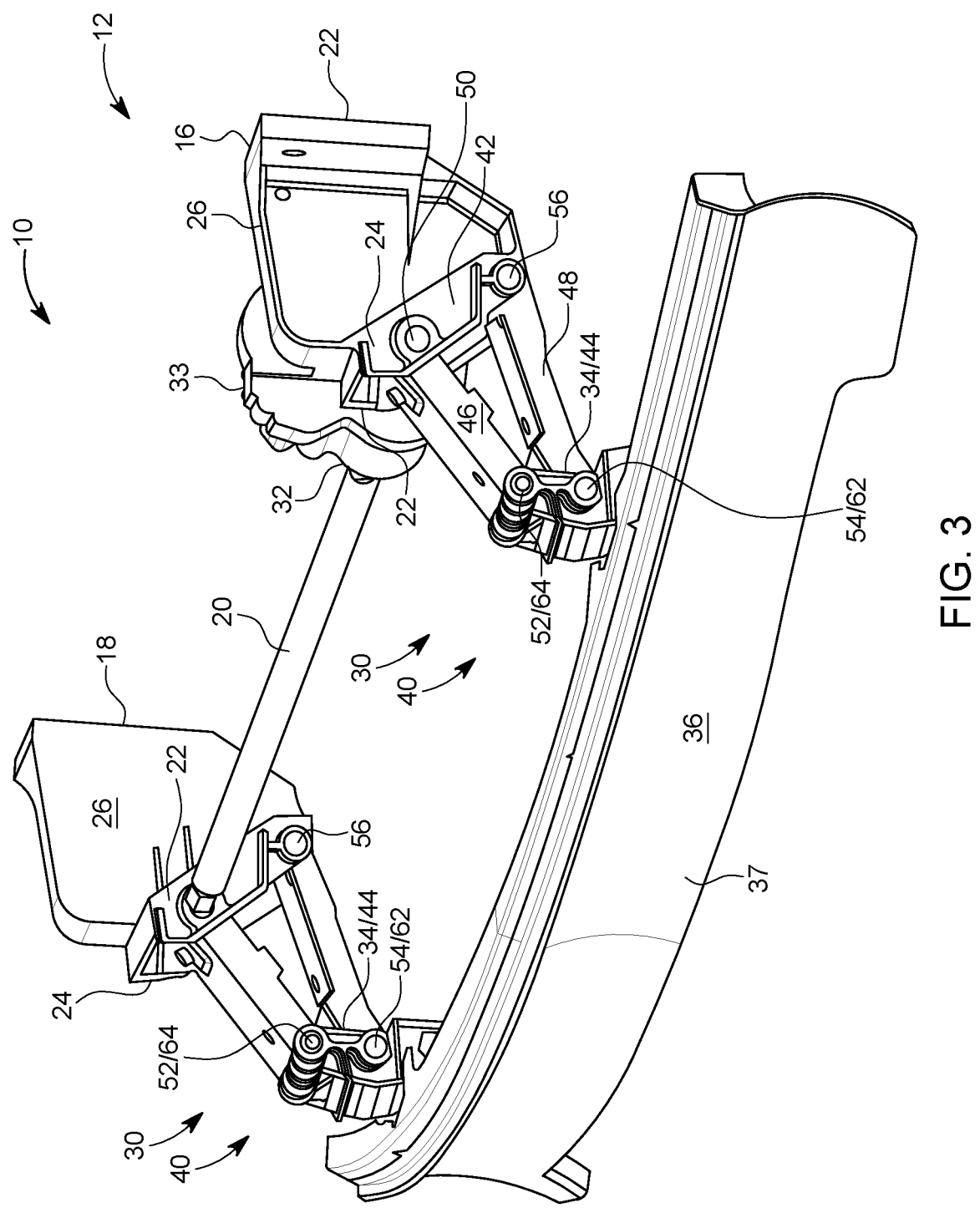
FIG. 3 is a perspective view of the air dam system of FIG. 1 in the deployed position.

FIG. 3 shows the linkage 30 in the deployed position with the air dam 36 in its active position. This deployed position may also be called the lowered, extended, or operational position. In this deployed position, the air dam 36 is oriented generally vertically in its active position, which may be purely vertical or at an angle closer to vertical than horizontal. As mentioned in the background section, in this position the air dam 36 performs its air deflecting function to improve vehicle aerodynamics. In this position, however, the air dam 36 is closer to the ground and thus susceptible to contact with objects like curbs, parking blocks, road debris, etc. In the illustrated embodiment, the air dam 36 has a lateral curvature to assist with its aerodynamic flow direction function. However, the shape and configuration of the air dam 36 is an example and not limiting, and person of ordinary skill in the art would understand other configurations can break up or direct air flow.

The linkage 30 and its air dam mounting portion 34 may have any construction or configuration, and the illustrated embodiment is not limiting. In the illustrated embodiment, each linkage 30 is a four-bar linkage 40 as an example. Each four-bar linkage 40 comprises one bar 42 provided by the mounting bracket 16, 18, one bar 44 provided by the air dam mounting portion 34, and upper and lower bars 46, 48 pivotally connected between the other two bars 42, 44. The linkages are connected by four pivot pins 50, 52, 54, 56. The bar 42 provided by the mounting bracket 16, 18 is illustrated as being constituted by the two mounting flanges 22, 24 integral with the mounting bracket 16, 18. That bar 42 may also be a separate component attached to the mounting bracket 16, 18. The rear ends of the upper and lower bars 46, 48 are received between the flanges 22, 24, and secured by the pins 50, 56 for pivotal movement. The air dam mounting portion 34 is secured for pivotal movement to the front ends of the upper and lower bars 46, 48 by pins 52, 54. These components can also be seen in the exploded view of FIG. 8.

As mentioned, the air dam 36 is mounted to the air dam mounting portion 34 of the linkage 30, and here the two linkages 30. The driver 32 is connected to the linkage 30 for moving the linkage 30 under power between the stored and deployed positions. As mentioned above, for the right linkage 30 in the Figures (the driver's side of a North American vehicle) the driver 32 is on the bracket 16 and can be connected directly to the linkage 30. For that connection, the driver 32 may have an output shaft or socket that connects to the pivot pin 50, and the pivot pin 50 has a fixed relation with the upper bar 46 to impart rotation of the pin 50 to the bar 46. For example, the pin 50 and an opening in the bar 46 could have a toothed, knurled, splined, squared, half-circled, notched or other irregular configuration for rotationally locking the same together, or welding, a pin, or other features could be used for such rotational locking. Likewise, the drive shaft 20 could extend through the driver 32 to constitute the pivot pin 50 and engage with the bar 46 in the same manner. Similarly, for the left linkage in the Figures (the passenger side of a North American vehicle) the drive shaft 20 in FIG. 1 can extend through the inboard one of flanges 22, 24 and serve as the pivot pin 50 engaging the upper bar 46 in the same rotationally locked manner, or connect to a separate pivot pin. Thus, the single driver 32 is able to impart motion to both linkages 30 simultaneously via the shaft 20. As mentioned, FIGS. 8 and 10 show a design where two such drivers 32 are used without the drive shaft 20.

The air dam 36 has an attachment portion 60 extending upwardly therefrom, and in the illustrated embodiment a pair of attachment portions 60 is shown, one for each linkage 30 and bracket 16, 18. The attachment portion 60 may be formed integrally with the air dam 36 (i.e., formed as one continuous piece), or it may be formed as a separate part. In the illustrated embodiment, the attachment portions 60 are formed as separate parts attached to the air dam 36 on the rear surface thereof by any suitable method. This may be desirable where the air dam 36 is made of a more flexible or pliant material, like plastic or a composite, and the attachment portion 36 is made of a more durable or high strength material like a metal, such as steel or aluminum. The particular construction and configuration is not intended to be limiting, nor is the selection of materials.

Figure 9A:
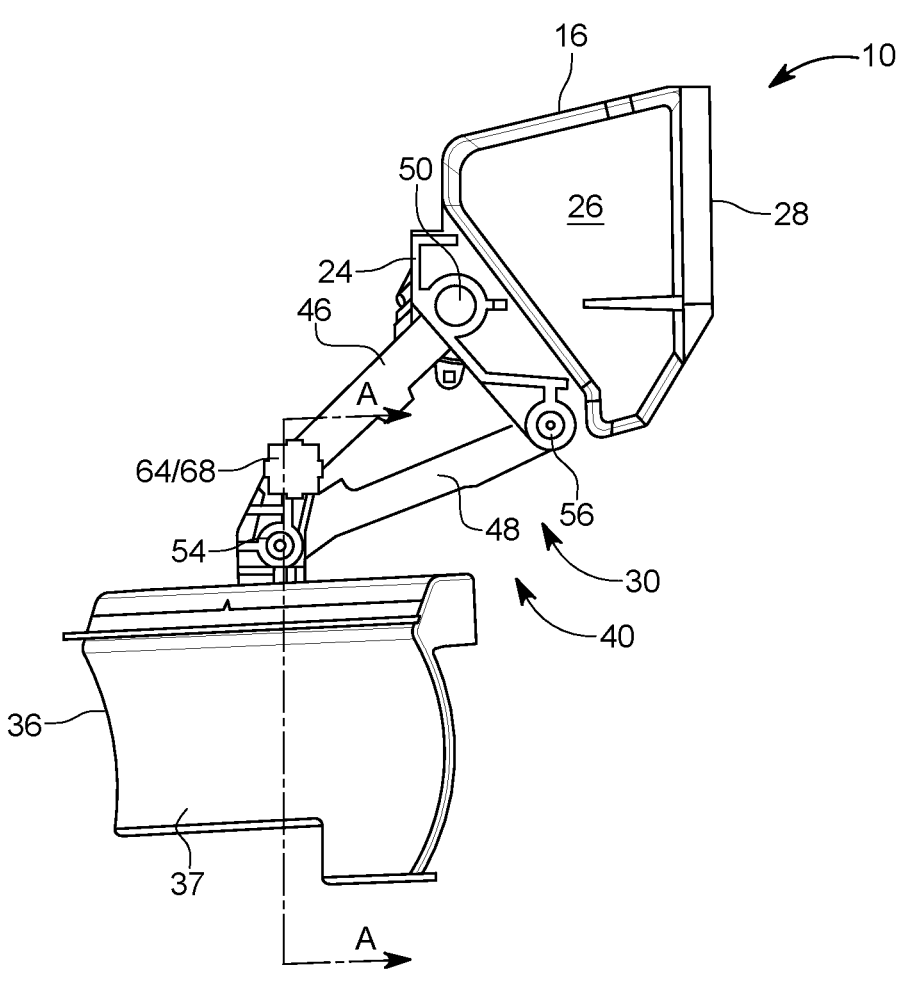
FIG. 9 is a close-up and cross-sectional view showing components of the system of the type on FIG. 1 to show elements associated with the releasable connector.
Figure 9B:
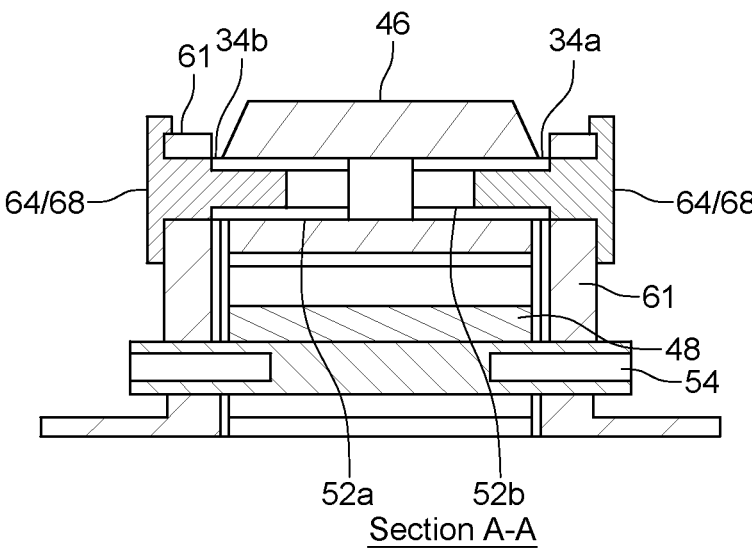

On each side, the air dam 36 is connected to the air dam mounting portion 34 of the linkage by a pivotal connector 62 and a selectively releaseable connector 64. The pivotal connector 62 and the selectively releaseable connector 64 cooperate to maintain a fixed relationship between the air dam 36 and the air dam mounting portion 34. That is, the two connectors together keep the air dam 36 from pivoting relative to the air dam mounting portion 34 under normal conditions, and thus the air dam is fixed relative to the air dam mounting portion 34 and its position relative to the vehicle is controlled by the linkage(s) 30. This normally fixed position may be referred to as the air dam's 36 normal, initial or original position relative to the air dam mounting portion 34, as this is the position that is normally maintained absent the release of the connector 64, as discussed below. In the illustrated embodiment, the pivotal connector 62 is the same pin 54 that connects the air dam mounting portion 34 and the lower bar 48 of the linkage 30. The same pin 54 is used in the illustrated embodiment for reduced complexity and part count. Specifically, the pin 54 is inserted through aligned openings in each of the air dam mounting portion 34, the lower bar 48, and the lower part of the attachment portion 60 (i.e., closer to the air dam 36 part responsible for air deflection), as shown in FIGS. 8 and 9. A separate pivotal connector may also be used, and may have a different location from pin 54.

The selectively releaseable connector 64 in the illustrated embodiment is shown in axial alignment with the pin 52 that connects the air dam mounting portion 34 and the upper bar 46. This is also not limiting, and the selectively releasable connector 64 may have a different location. In the illustrated embodiment, the selectively releaseable connector 64 can be the pin 52 itself, with the pin 52 extending through aligned openings in the air dam mounting portion 34, the upper bar 46, and the upper part of the attachment portion 60. The selectively releasable connector 64 can also be a pair of shorter pins inserted into the openings 65 on the attachment portion 60 that engage openings on the air dam mounting portion 34, and those openings may be aligned with the pin 52. A single such pin on one lateral side may also be used as the selectively releasable connector. The illustrated design is thus not intended to be limiting.

Figure 4:
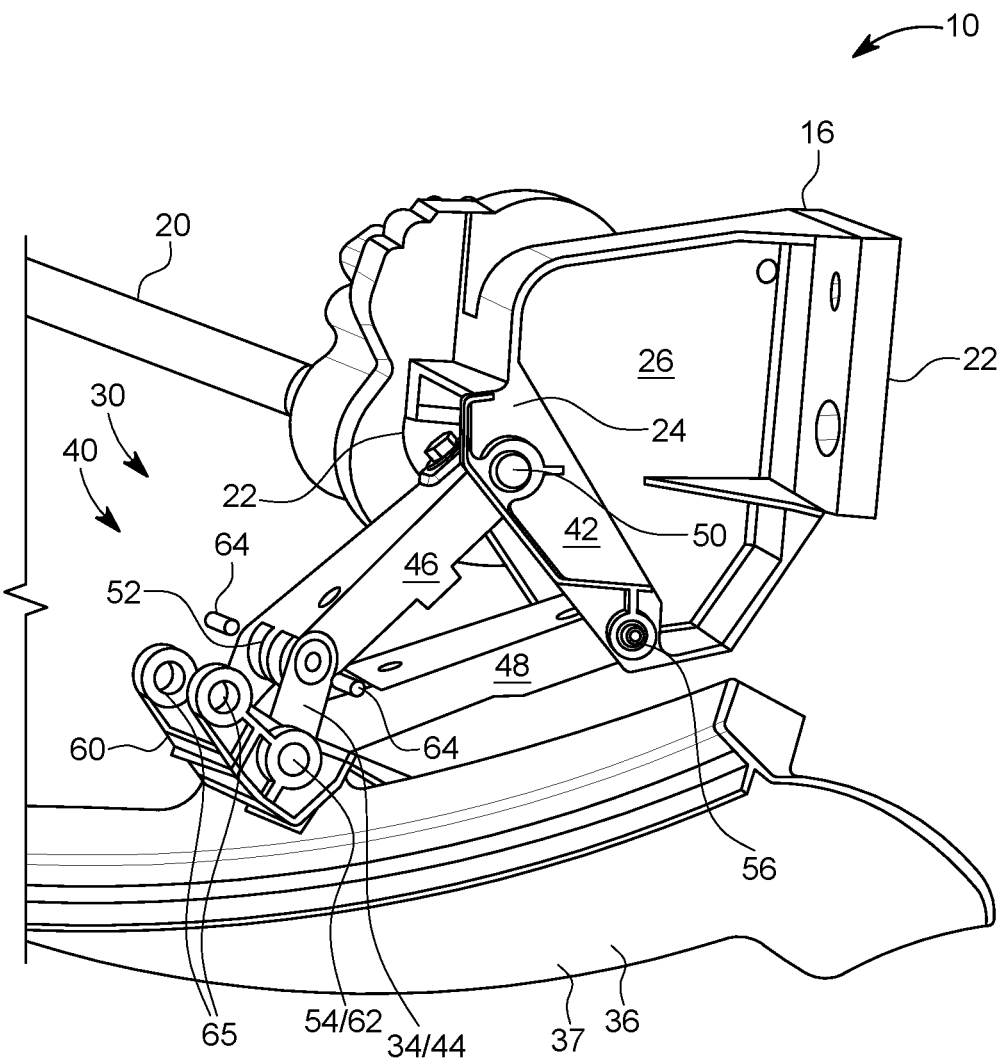
FIG. 4 is a close-up perspective view of the air dam system of FIG. 1 in the deployed position with the air dam pivoting rearwardly after impact with an object.
Figure 5:
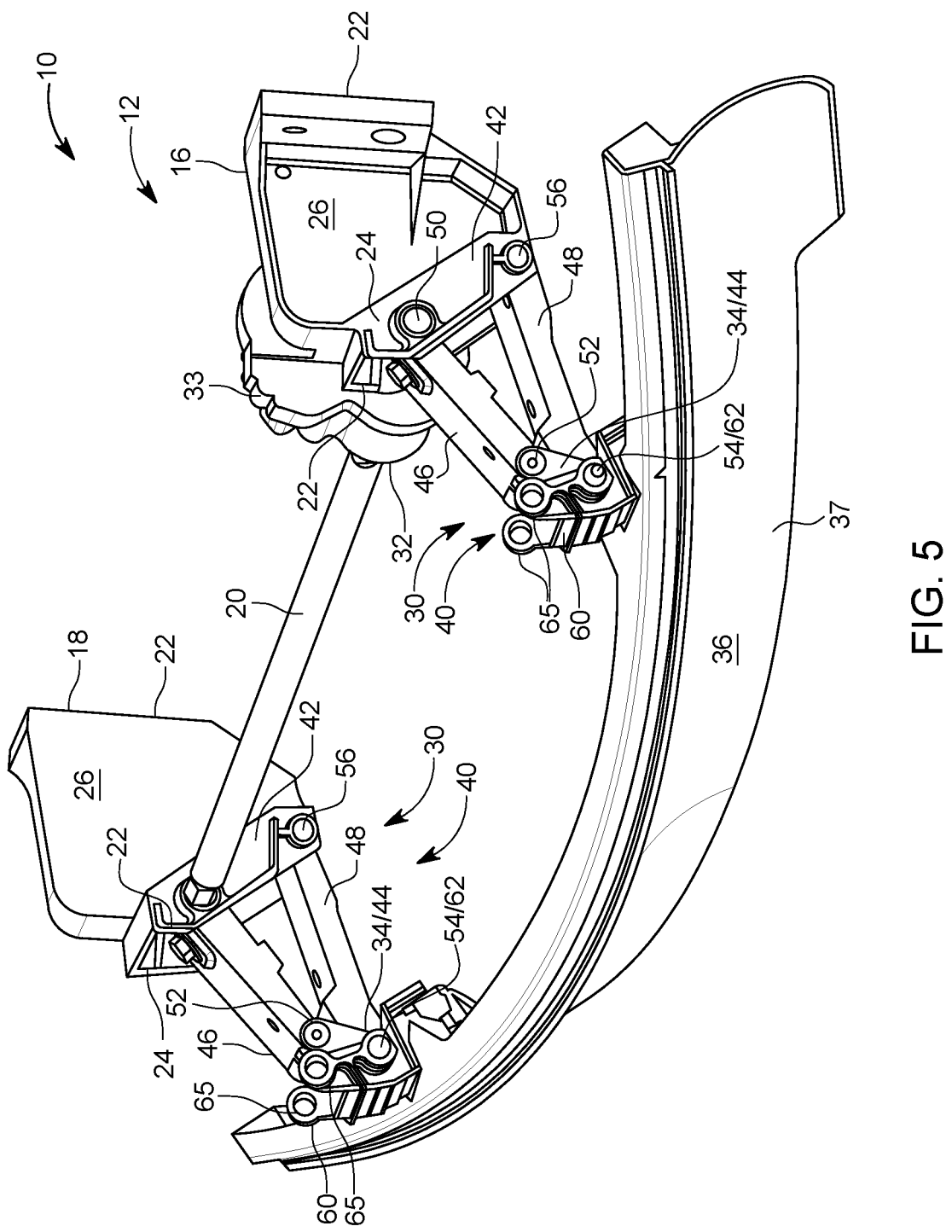
FIG. 5 is a perspective view of the air dam system of FIG. 1 in the deployed position with the air dam pivoting rearwardly after impact with an object.

The selectively releaseable connector 64 is configured to release its connection of the air dam 36 and the air dam mounting portion 34 in response to a force exceeding a threshold amount being applied thereto by the air dam 36 pivoting rearwardly relative to the air dam mounting portion 34 about the pivotal connector 62, e.g., pin 54. This enables the air dam 36 when striking an object in the active position thereof on the deployed linkage(s) 30 to pivot rearwardly about the pivotal connector 62. This is shown in FIGS. 4 and 5, where the selectively releasable connector 64 has released and the air dam 36 is pivoted rearwardly. This is also shown in FIG. 10a. In the illustrated embodiment, the release occurs above the pivotal connector 62 which remains intact, thus allowing the upper part of the attachment portions 60 on the air dam 36 to move forwardly away from the air dam mounting portion 34 as the flow deflecting part of the air dam 36 pivots rearwardly.

The force at which release occurs may be selected at any desired level, and for example may be empirically selected. The threshold force is preferably substantially higher than the force applied to the releasable connector 64 by normal wind resistance against the air dam 36, and is selected to be consistent with striking an object like a curb, parking block, road debris or the like. The threshold force selected is also preferably lower than a force that would damage the linkage(s) 30. Hence, the selectively releasable connector 64 is designed so that when the air dam 36 impacts and object to apply a force to the selectively releasable connector 64, the force threshold at which the selectively releasable connector 64 releases is below a force that, if it were transmitted to the linkage(s) 30, would cause damage to the linkage(s) 30. In other words, the selectively releasable connector 64 may be described as releasing its connection between the air dam 36 and the air dam mounting portion 34 in preference to transmitting potentially damaging force to the linkage 30.

In the embodiment of FIGS. 1-10b, the selectively releaseable connector 64 is a frangible connector and the force exceeding the threshold amount is a force that breaks the frangible connector to release its connection to the air dam 36, which is at the attachment portion 60 in the illustrated design. As mentioned above, the air dam 36 may have a release pin receiving aperture or opening 65, the air dam mounting portion 34 of the linkage 30 may have an aligned release pin receiving aperture or opening, and the frangible connector is a frangible release pin received in both those release pin receiving apertures. As mentioned, the frangible connector may be the same pin 52 that also connects the upper arm 46 and the air dam mounting portion 34. It may also be a separate pin or pins as mentioned above. In either approach, the frangible release pin is configured such that the force that breaks the frangible release pin is a force that shears the release pin by pivoting of the air dam 36 to move the release pin receiving aperture(s) 65 thereof (on the upward extension(s) 61 of the attachment portion 60) relative to the release pin receiving aperture of the air dam mounting portion 34. In the illustrated embodiment, as the attachment portion 60 is forced forwardly during an impact that initiates rearward pivoting of the air dam 36, that causes displacement of the openings or apertures for the frangible pin or pins. This causes shearing of the pin or pins to release the attachment portion 60 so it can move forwardly and the air dam 36 can pivot rearwardly.

In some embodiments, using a pin or pins separate from the pin 52 that pivotally connects the upper arm 46 and the air dam mounting portion 34 is preferred to avoid having the upper arm 46 and the air dam mounting portion 34 become disconnected. However, it is also possible to use the same pin 52 for both purposes and design the pin so that it remains in place to connect the air dam mounting portion 34 and the upper arm 46, and just a part or parts of the pin responsible for connection to the air dam 36 and its attachment portion 60 are permitted to shear/fail. For example, the pin 52 could have threads on each end and nuts could be run over the threads to secure the air dam mounting portion 34 and the upper arm 46 together, while having end portions of the pin extending axially from the nuts for receipt in the openings 65 of the air dam attachment portion 60. With that configuration, the shear point may be axially outside the nuts, thus leaving the inner part of the pin 52 intact for connecting the air dam mounting portion 34 and the upper arm 46. Also, intentional failure points could be designed into the pin, such as a notch or other structural weakening to ensure the location of the shearing. This technique could be practiced on just one end also. Other features besides nuts could also be used for securing the inner part of the pin 52 to maintain its inner part in place for the connection between the air dam mounting portion 34 and the upper arm 46. Similarly, some materials, and particularly plastics, may deform plastically during shearing so as to leave a partially mushroomed head towards the front to resist withdrawal of the pin 52 from the openings of the air dam mounting portion 34 and the upper arm 46.

In the illustrated embodiment, and particularly as shown in FIGS. 6-9, the pin 52 is constituted by two pins 52a and 52b. In that non-limiting Figure, the air dam mounting portion 34 has two arms 34a, 34b and the pins 52, 52b are attached thereto to extend inwardly. During assembly, the two pins 52a, 52b are inserted into openings on the upper arm 46, and the arms 34a, 34b are secured together by the lower pin 54 that is inserted for connection to the lower arm 48. This places the two pins 52a, 52b in axial alignment extending inwardly towards one another. The two pins 52a, 52b are illustrated as hollow and open to the lateral outer ends thereof. The frangible connectors are constituted by pins 68 inserted into the pins 52a, 52b, which pins 68 extend outwardly into the openings 65 on the air dam 36, and specifically on the attachment portion's 60 extensions 61. Advantageously, if the air dam 36 strikes an object and pivots rearwardly so as to move the attachment portion 60 forwardly from the air dam mounting portion 34, the failure of the pins 68 enabling that movement will not interfere with the pins 52a, 52b connection of the upper arm 46 and the air dam mounting portion 34. Optionally, the pins 68 may have a radially larger head (such as with a circular shape) as illustrated and with snap-fit features on the radial edges thereof to assist with securement. Also, such an opening 65 for receiving a pin 68 need not be fully enclosed opening or a through-hole opening, and may be any open space that receives the pin 68 to keep the air dam 36 from pivoting rearwardly. For example, a C-shaped opening or a recess in which the pin 68 engages is also an opening that receives the pin 68.

In another embodiment, the pin 52 that connects the air dam mounting portion 34 and the upper arm 46 may be hollow singular pin, and the selectively releasable connector 64 is another pin that is inserted therethrough. The hollow pin 52 would extend axially through the openings for the air dam mounting portion 34 and the upper bar 46 and connect them similarly to the pivot pins at the other corners of the linkage 30. But the hollow pin would not extend into the associated openings 65 on the air dam's attachment portion 60. Instead, the inner pin that constitutes the selectively releasable connector 64 extends through the hollow pin 52 and into the openings 65 on the air dam's attachment portion 60. Thus, when an object is struck to apply a force to the pin acting as the selectively releasable connector 64, that pin can fail to permit air dam 36 to separate forwardly at its attachment portion 60 from the air dam mounting portion 34 so the air dam 36 and particularly its air deflecting portion 37 can pivot rearwardly. This is another approach to allowing for the selective release using a frangible connector, such as a frangible pin, without disrupting the connection between the air dam mounting portion 34 and the upper bar 46.

Figure 6:
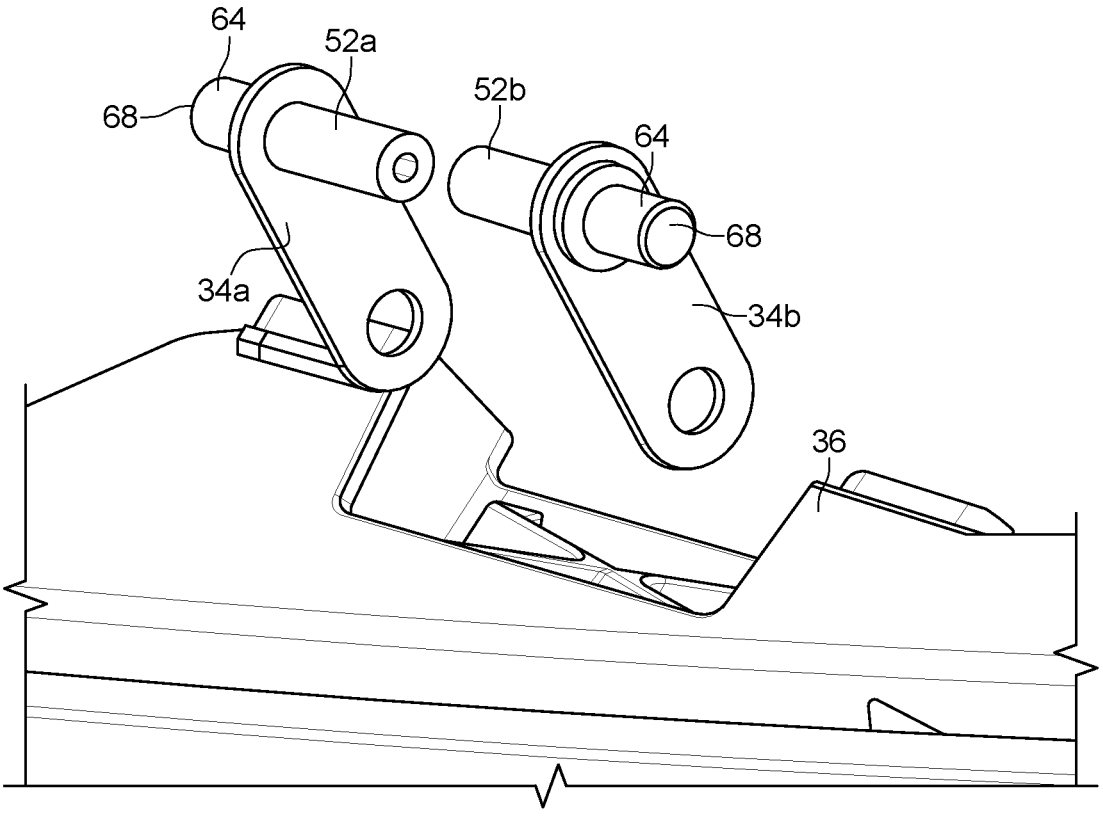
FIG. 6 is a view of components in the system of FIG. 1 showing pins associated with the releasable connector.

With a single hollow pin for pin 52, the releasable connectors 64 could also be two separate pins inserted at the axial ends of the hollow pin similar to the design in FIGS. 6 and 7. The difference with single hollow pin is that the single hollow pin would receive both the pins 68 of the releasable connector 64, rather than having them mounted in separate pins 52a and 52b.

In either design with a singular hollow pin or a pair of hollow pins like 52, 52b, the pin(s) or other structure constituting the selectively releasable connector 64 can optionally be made of a structurally weaker material, in particular one with a lower yield point in the shear plane, than the hollow pin(s), thus facilitating preferential failure of the selectively releasable connector 64. For example, the hollow singular pin or the pair of pins 52a, 52b could be made of steel or aluminum, while the selectively releasable connector could be plastic. In other embodiments, the pin(s) or other structure constituting the selectively releasable connector(s) 64 can be made of the same material.

With a selectively releasable connector 64 of the frangible type, because the frangible connector 64 fails in preference to damage of the linkage 30, when that occurs repair is simpler and may be accomplished by replacement of the connector 64. For example, in the approaches mentioned above where the frangible connector is a pin or pins, such as pins 68, replacement of the pin(s) can be straightforward. In the illustrated embodiment, the air dam 36 can be moved so that it and the linkages 30 are returned to the stored position, where the openings for each pin are realigned and the new pins can be installed and fastened. If any remnants of an original pin are present, they can be dislodged first. This provides for a much less complex and less expensive repair process than if the force were transmitted to the linkage(s) 30 directly and components of the linkage(s) 30 failed.

In illustrated embodiment, using two linkages 30 with two mounting brackets 16, 18 has the advantage that an off-center impact may cause release of one connector 64 but not the other. Thus, it is possible that the air dam system 10 may remain partially functional under the control of one linkage 30 even if selectively releasable connector on the other linkage 30 has been released. Specifically, the intact linkage 30 may remain able to move the air dam 36 between the stored and deployed positions thereof, albeit with not as much control as if both linkages 30 were completely connected to the air dam 36. This has the advantage of allowing the air dam system 10 to continue performing its function at some level until a repair can be made, although it is optional and in some embodiments the system may be designed differently.

Other frangible connectors may be used, and the use of a pin is not limiting. Other structures that break away or fail, such as projections, ties, snap-fit connectors, etc. may be used to selectively secure the air dam 34 in its normal position relative to the air dam mounting portion 34 in cooperation with the pivotal connector 62, and release that securement for pivotal movement of the air dam 36 in the event of an impact of sufficient force.

As another example of a frangible connection, the air dam mounting portion 34 could have a front wall or flange and the air dam's attachment portion 60 could also have a front wall or flange, which front walls/flanges face one another in the normal position of the air dam 36. Each wall/flange could have aligned openings therethough in which a frangible connector is inserted. Such a frangible connector could optionally be a plastic insert, such as an insert with a head on the front end thereof and a snap-fit connection on the rear end thereof that is inserted into the aligned openings to releasably connect the air dam 36 in fixed relation with respect to the air dam mounting portion 34. The plastic insert will fail under tension at a threshold force, thus freeing the attachment portion 60 to move forwardly so the air dam 36 can pivot rearwardly similarly to embodiments above. Like other embodiments, repair is straightforward, and simply requires return of the air dam 36 its original position and insertion of a new insert. Similarly, a plastic rivet could be used as well, wherein the user inserted a headed plastic insert and deforms the inserted end to create an opposing head for securement. Metal can also be used for such an insert as well if desired, particular structurally weaker metals or metal structures of thinner cross-section or with structurally weakened points to ensure sufficient release.

FIGS. 11-22b illustrate another embodiment with a selectively releasable connector 70. Because common parts are used between the embodiments, particularly for the basic elements of the air dam system, common reference numbers will be used where applicable, and different reference numbers will reflect the differences. The reference number 10' is used to differentiate this embodiment from the prior one for convenience. In this embodiment, a selectively releasable connector 70 moves between (a) an engaged position connecting the air dam 36 to the air dam mounting portion 34 for cooperating with the pivotal connector to maintain the fixed relationship between the air dam 36 and the air dam mounting portion 34 and (b) a disengaged position to release its connection of the air dam 36 to the air dam mounting portion 34 in response to the force exceeding the threshold amount being applied thereto by the air dam 36. The difference here in the embodiment of the system 10' is that the connector 70 releases by a change in its position, rather than failure by shearing or another form of breakage.

In the non-limiting illustrated embodiment, the selectively releasable connector 70 is biased to the engaged position, and the force exceeding the threshold amount to move the selectively releasable connector 70 to the disengaged position is a force that overcomes that biasing to the engaged position. The threshold force may be selected as discussed above, but in this embodiment it is the force that overcomes the biasing, rather than a force that causes material failure. Preferably, but not necessarily a spring 72 is used for biasing the selectively releasable connector 70 to the engaged position. When the force applied to the connector 70 reaches the threshold level, that is sufficient to force the connector 70 against the spring 72 to the disengaged position thereof.

In the illustrated embodiment, the selectively releasable connector 70 is mounted to the air dam mounting portion 34 for movement between the engaged and disengaged positions thereof. It is also possible to mount the selectively releasable connector 70 to the air dam 36, and particularly its attachment portion 60. That is, the design illustrated may be reversed to put the connector 70 on the attachment portion 60 of the air dam 36, with the spring 72 also mounted there, such that the connector 70 in the engaged position engages the air dam mounting portion 34 to releasably secure the air dam 36 in its normal position relative to the air dam mounting portion 34. Thus, the selectively releasable connector 70 may be mounted to either one of the air dam mounting portion 34 and the air dam 36, although the illustrated embodiment shows it on the air dam mounting portion 34.

With the selectively releasable connector 70 mounted to either one of the air dam mounting portion 34 and the air dam 36, the connector 70 and the other of the air dam mounting portion 34 and the air dam 36 each has camming surfaces 74, 76 for engaging with one another in the engaged position of the selectively releasable connector 70. The camming surfaces 74, 76 are configured to cam against one another to apply the force exceeding the threshold amount to move the selectively releasable connector 70 to the disengaged position by the air dam 36 pivoting rearwardly relative to the air dam mounting portion 34 about the pivotal connector 62.

The selectively releasable connector may be a pin 78 slidably mounted to either of the air dam mounting portion 34 and the air dam 36 with an end of the pin 78 providing the camming surface 74 thereof, and the other of the air dam mounting portion 34 and the air dam 36 has a pin receiving opening 65 providing the camming surface 76 thereof and receiving the end of the pin 78. As illustrated, the pin 78 is slidably mounted to the air dam mounting portion 34 and the pin receiving opening 65 is provided on the air dam 36, and in the example is on the air dam attachment portion 60. The illustrated pins 78 have a ball pin shape, or half-dome shape, and are each held in place by a retainer ring 79. The pin 78 may have any shape, including being more elongated, and the use of a retainer ring 79 is option.

As shown, there are two pins 78, one on each side of the air dam mounting portion 34 for each linkage 30. The pin 78 is slidably mounted in an opening in the air dam mounting portion 34 for movement between the engaged and disengaged positions thereof, and the spring 72 is engaged with the pin 78 to bias it to the engaged position. The pins 78 (and their springs 72) may be axially aligned with the pin 52 that connects the air dam mounting portion 34 and upper arm 46 as illustrated, or it may be radially offset to a different location. In a design where the pin or pins 78 are axially aligned, different design approaches are possible. As one example, the pin 52 may be a single hollow pin, and the pin or pins 78 are slidably mounted therein with the springs 72 mounted inside the pin 52. The hollow pin may have a body or other surfaces in its center to create limits for insertion of the pins 68 and their associated springs 72. It is possible to use a single spring as well to bias both pins 78.

As another example, the pin or pins 78 may have a short axial extent and are aligned axially with the pin 52 so as to project outwardly therefrom in the engaged position. The design in the first embodiment with the pins 52a and 52b inserted into openings on the upper arm 46 may be used, and springs 72 may be included inside the pins 52*a*, 52*b* to bias the pins 78 outwardly. This is illustrated in FIGS. 15, 16, 20 and 21.

The air dam attachment portion 60 has corresponding openings 65 on each lateral side to receive those pins 78. The inner edge of the opening 65 acts as its camming surface 76, and the pins 78 have a rounded head acting as the camming surface 74. Thus, when sufficient force is applied to the pin 78 by the air dam attachment portion 60 being forced away from the air dam mounting portion 34 due to the air dam 36 being struck in the rearward direction, the camming surface 76 acts against the camming surface 74 to force the pin(s) 78 inwardly against the springs 72 to the disengaged position. That frees the air dam 36 to pivot rearwardly and avoids the transfer of excess force to the linkage(s), similarly to the advantage discussed above for the frangible connector. With a selectively releaseable connector 70 that moves between engaged and disengaged positions, because the parts are not broken the air dam 36 can be returned to its original or normal position with respect to the air dam mounting portion 34 and the selectively releasable connector 70 can be returned to its engaged position securing the air dam 36 in its original or normal position.

One way for such return is for the user to do it manually, which simply requires the user to pivot the air dam 36 forwardly to its initial position. In such an approach, and in the other approaches mentioned hereinafter, the air dam 36 has a return stroke camming surface 84 on the attachment portion 60 thereof configured to cam against the camming surface 74 of the selectively releasable connector 70. This camming action applies the force exceeding the threshold amount to move the selectively releasable connector 70 to the disengaged position, which occurs by the air dam mounting portion 34 and the air dam 36 pivoting relatively toward one another as the air dam 36 is pivoted forwardly to its normal position. The camming surface 84 is an edge of the attachment portion 60 that engage the camming surface 74 of the pin 78 during the return movement of the air dam 36 to displace the pin 78 to its disengaged position, whereby its spring 72 can return the pin 78 to its engaged position when it aligns with the opening 65 on the air dam's attachment portion 60. In the illustrated embodiment, there are two return camming surfaces 84, one on each attachment portion upward extension 61 for each pin 78.

As mentioned, in some embodiments, the pin or pins may be mounted on the air dam 36 and the opening(s) may be on the air dam mounting portion 34, and thus the return stroke camming surface(s) may be provided on the air dam mounting portion 34 to engage the pin(s) as the air dam 36 is returned to its normal position. Thus, the pin or pins in a broad sense may be slidably mounted to either of the air dam mounting portion 34 and the air dam 36 with an end of each pin providing the camming surface thereof, and the other of the air dam mounting portion and the air dam 36 will have the pin receiving opening(s) providing the camming surface (s) thereof and receiving the end of each pin, and will also have the edge or edges providing the return camming surface thereof.

Another way to return the air dam 36 to its normal position secured to the air dam mounting portion 34 is by configuring the air dam 36 and the linkage 30 to reestablish the selectively operable connector 70's connection in the engaged position thereof (i.e., its connection of the air dam 36 to the air dam mounting portion 34) as a result of the linkage 30 being moved back to the stored position after the air dam 36 has pivoted rearwardly about the pivotal connector 62. By configuring the geometry or mechanics of the system 10', and particularly the relationship between the air dam 36 and the linkage 30, the system 10' can automatically return the air dam 36 to its normal position without the need for user intervention.

Figure 14:
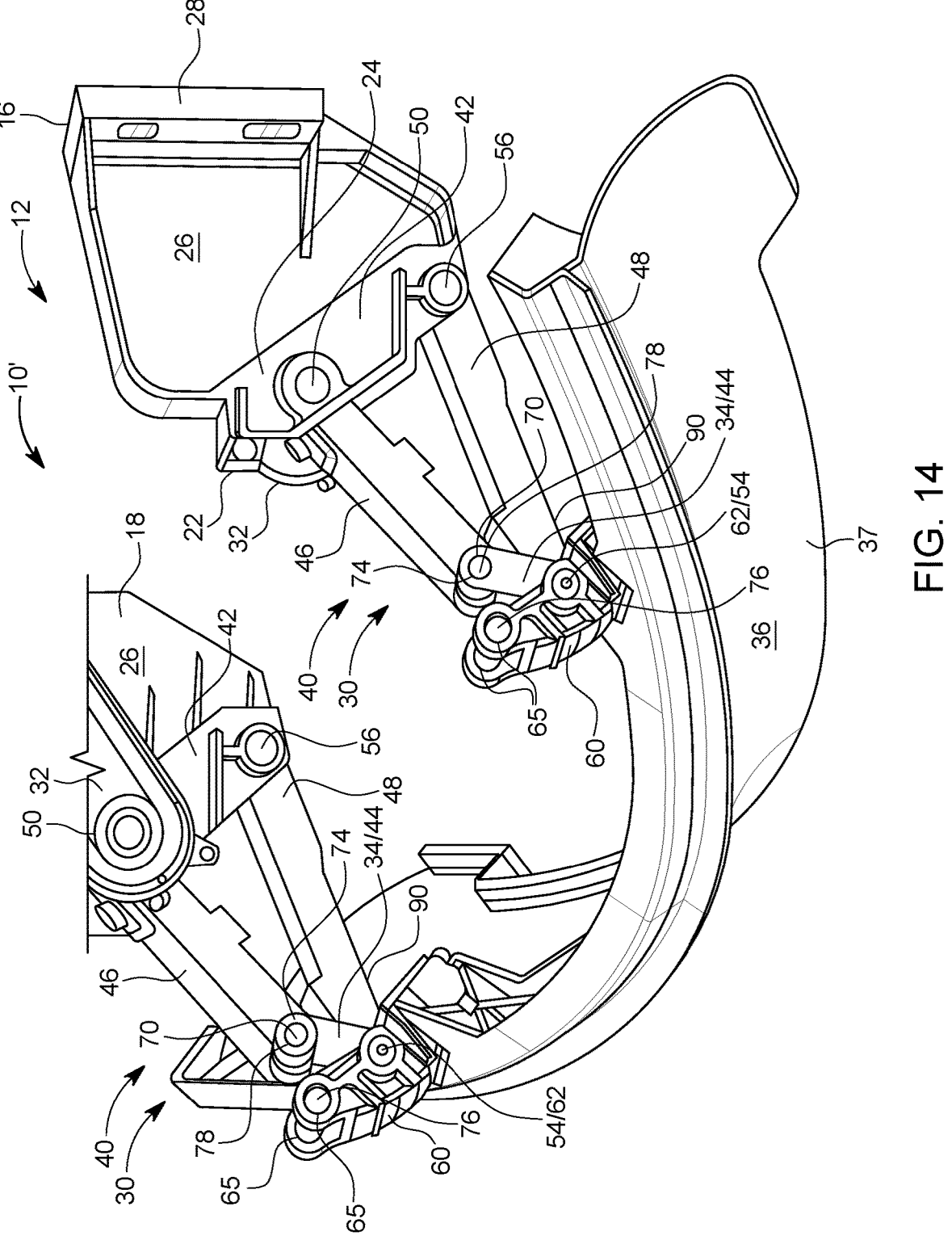
FIG. 14 is a perspective view of the air dam system of FIG. 11 in the deployed position with the air dam pivoting rearwardly after impact with an object.
Figure 15:
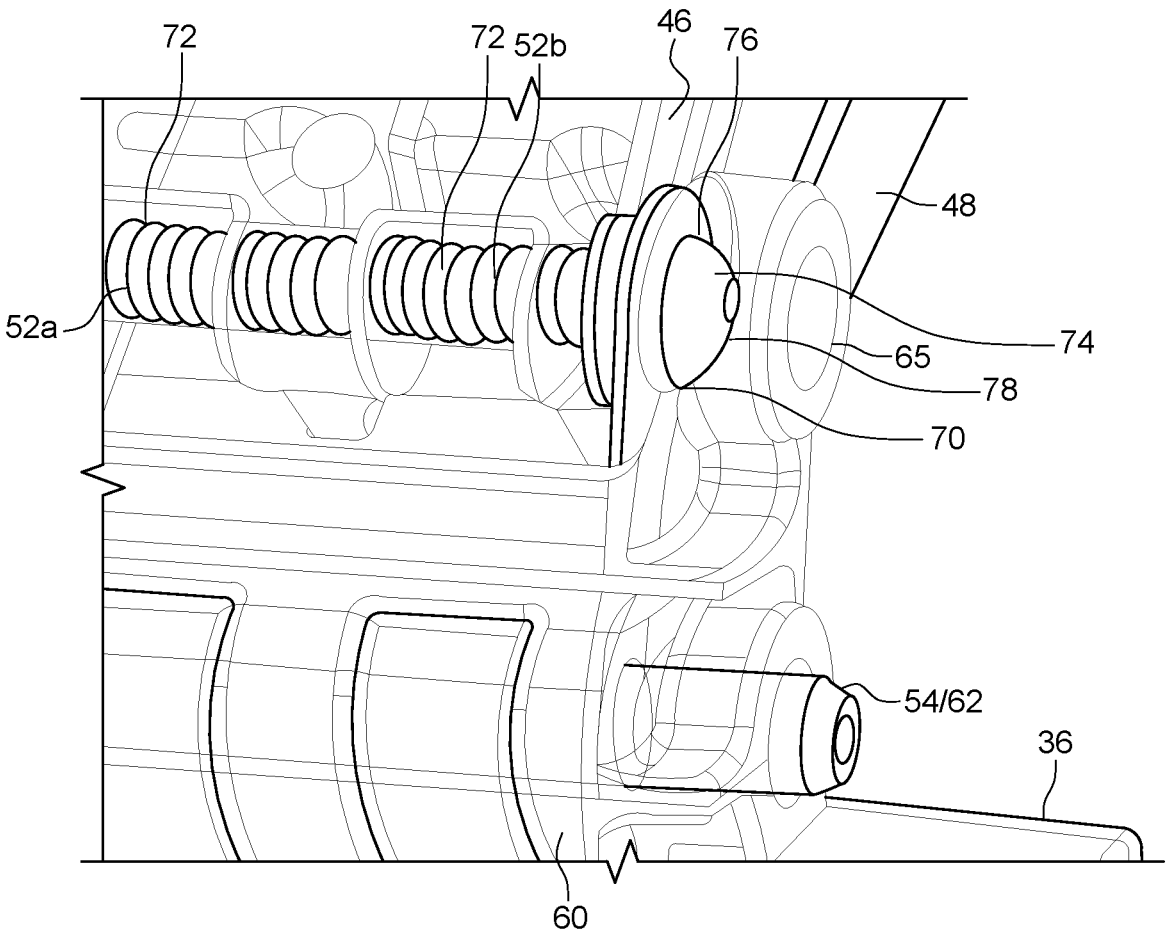
FIG. 15 is a close-up perspective view of the air dam system of FIG. 11 with some components in transparent to show elements associated with the releasable connector.
Figure 16:
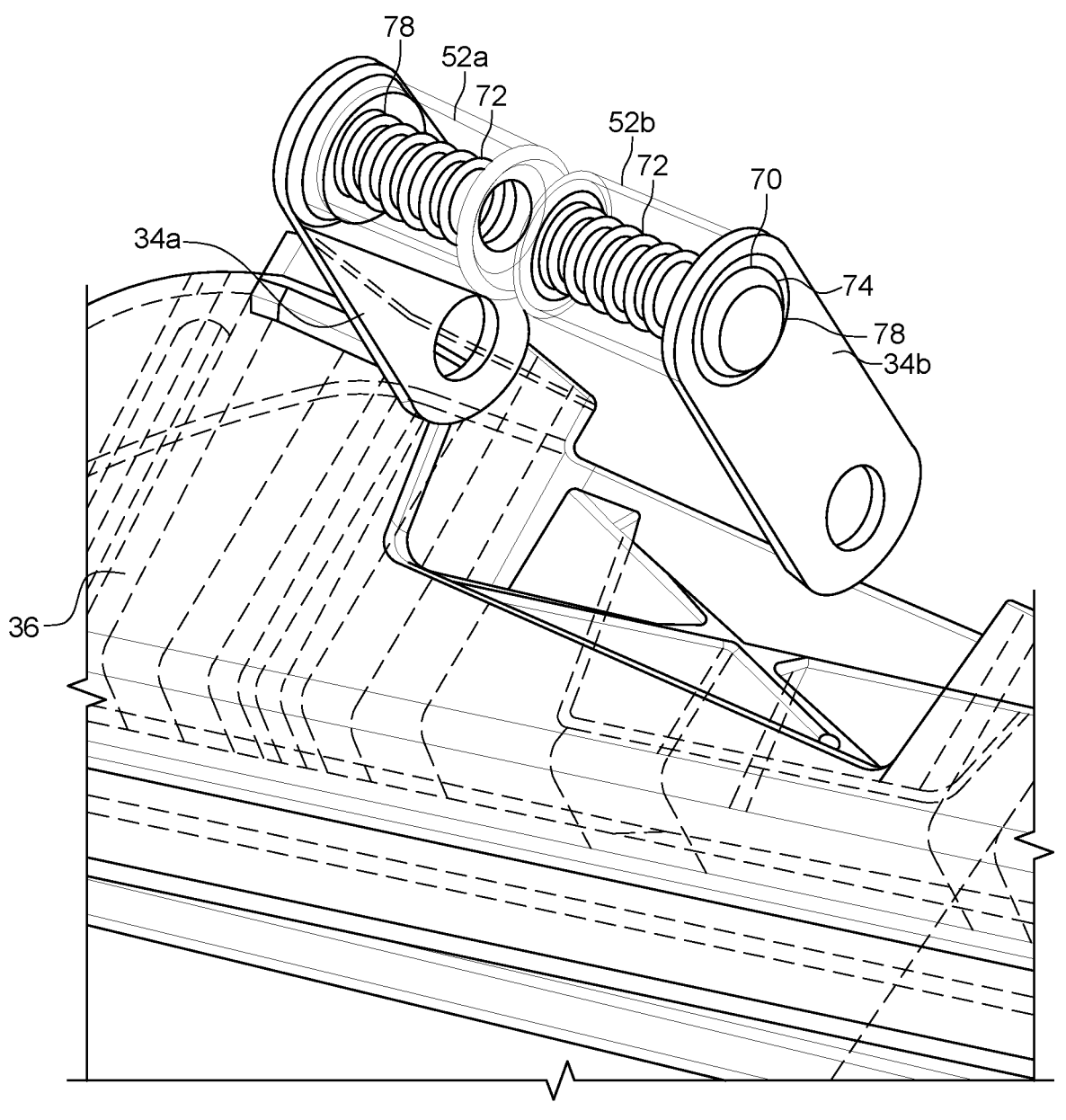
FIG. 16 is a view of components in FIG. 15 showing pins associated with the releasable connector.
Figure 17:
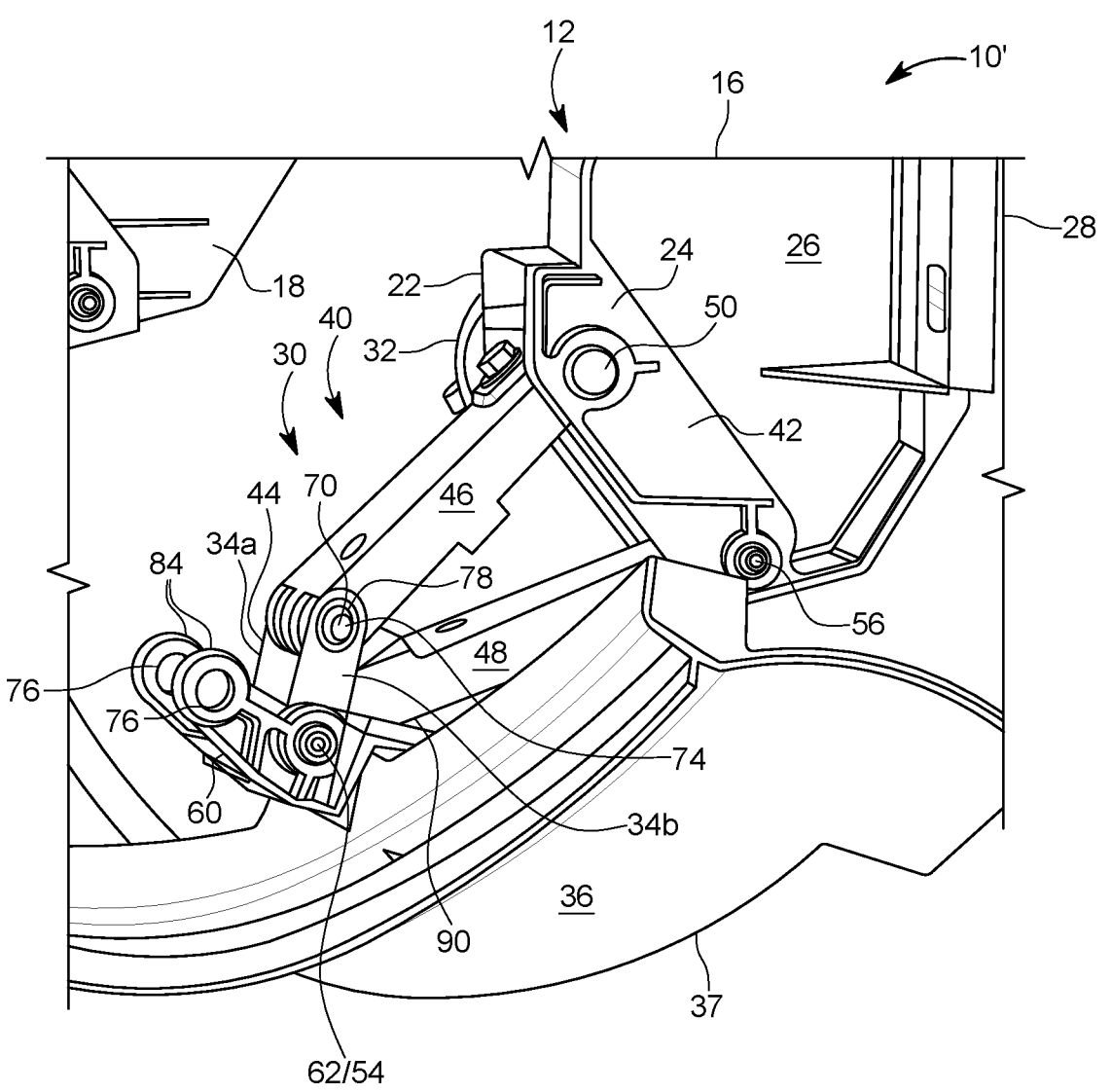
FIG. 17 is a close-up perspective view of the air dam system of FIG. 11 in the deployed position with the air dam pivoting rearwardly after impact with an object.
Figure 18:
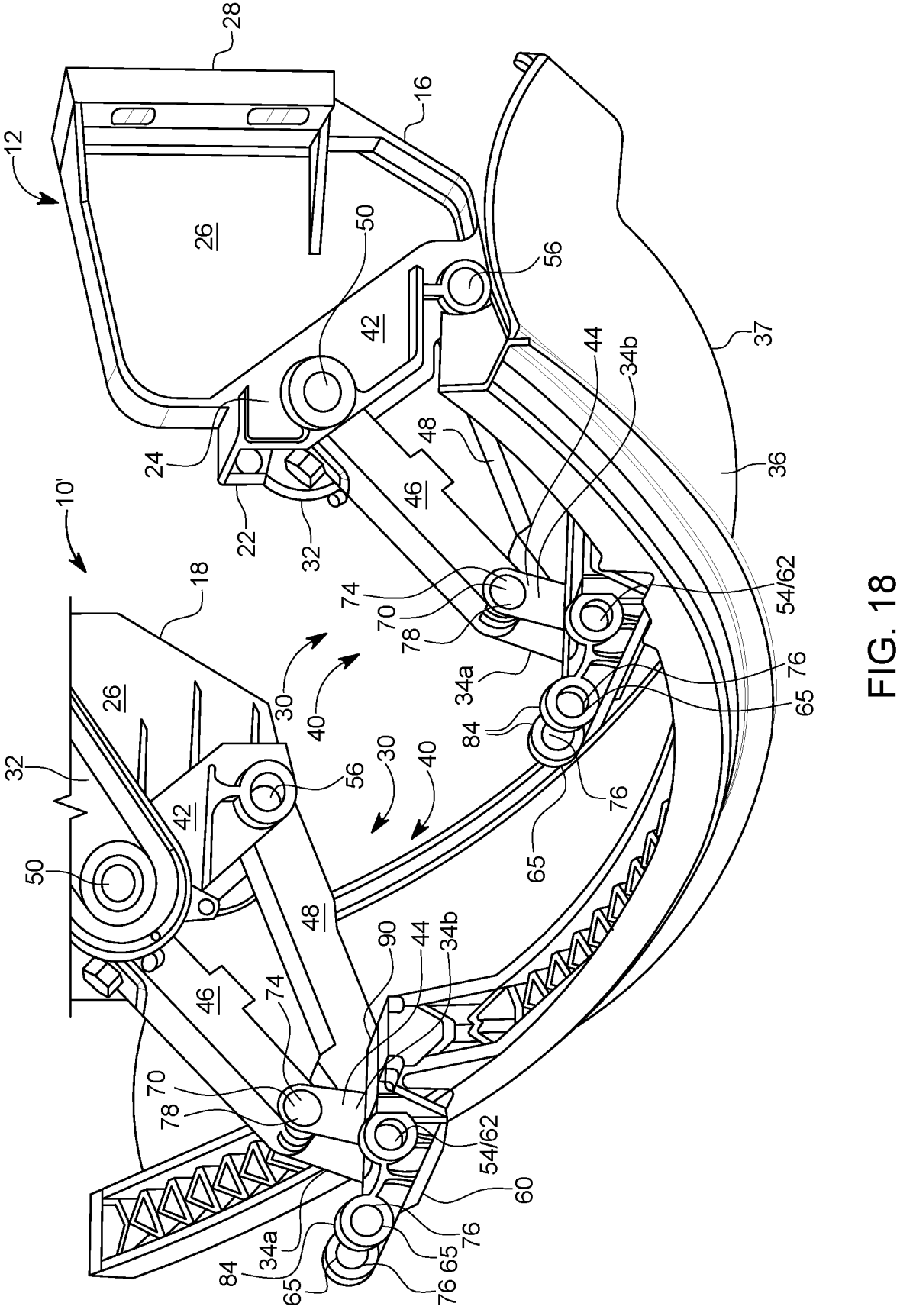
FIG. 18 is a perspective view of the air dam system of FIG. 11 in the deployed position with the air dam pivoting fully rearwardly after impact with an object.
Figure 19:
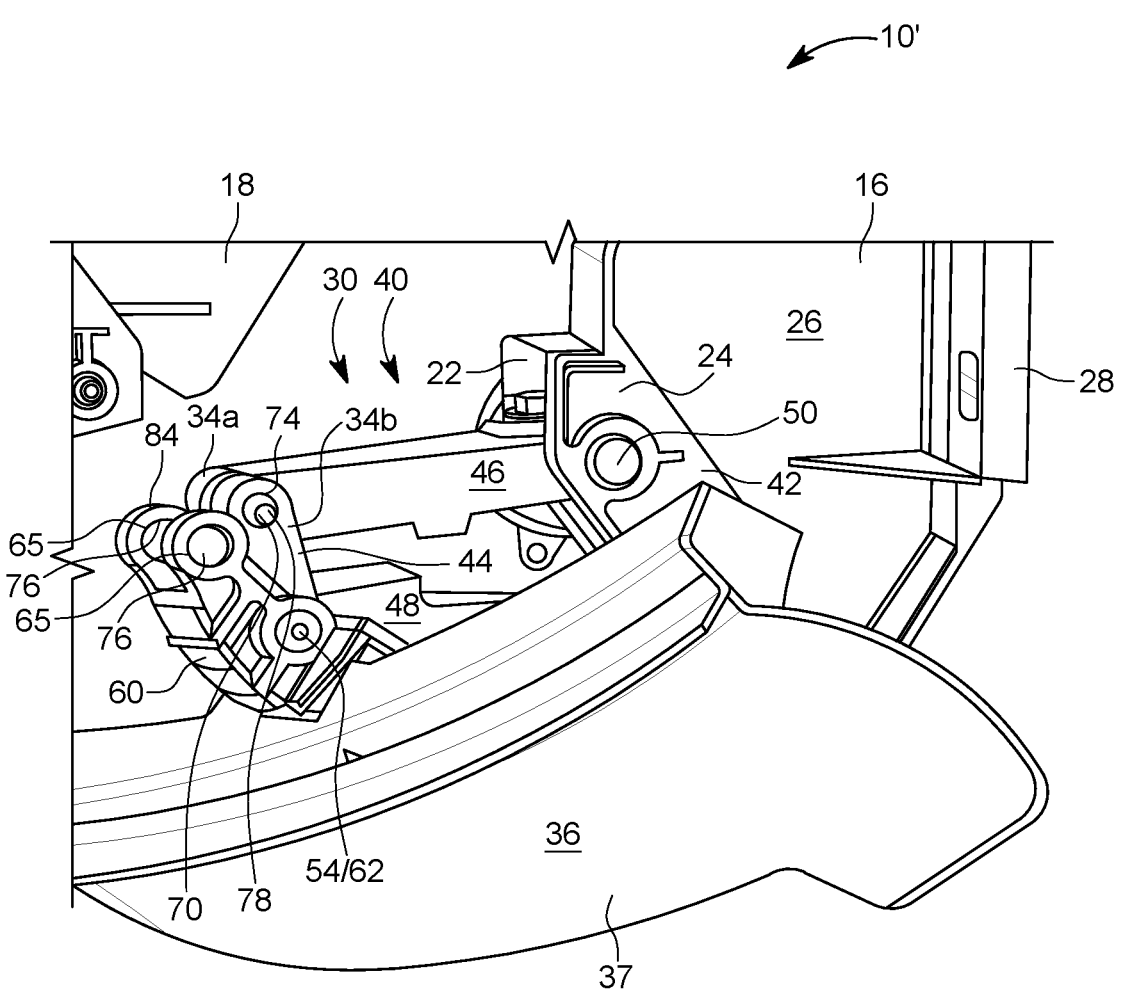
FIG. 19 is a close-up perspective view of the air dam system of FIG. 11 returning back to the stored position with the air dam pivoted rearwardly.
Figure 20:
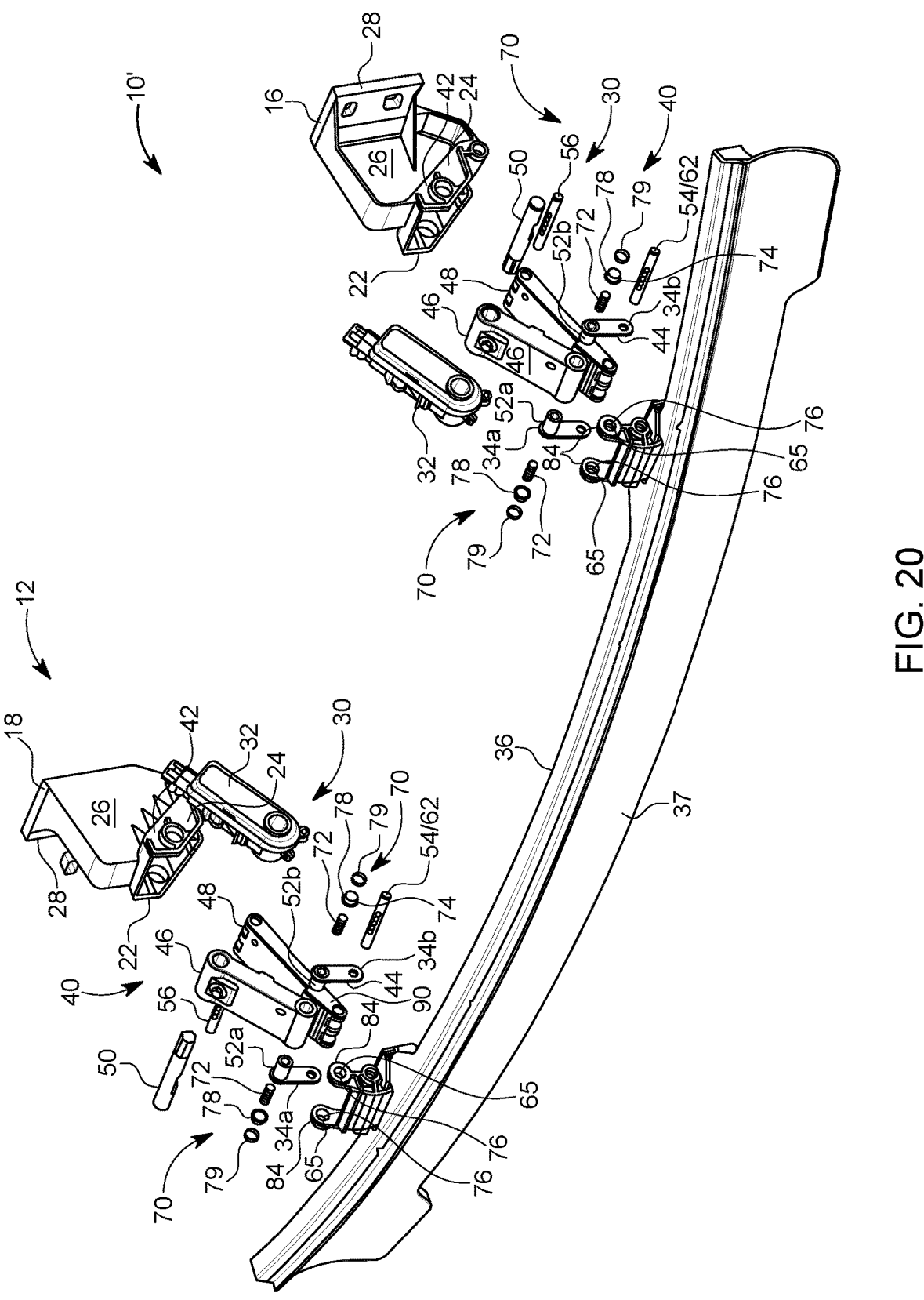
FIG. 20 is an exploded view of the embodiment of FIG. 11.
Figure 21A:
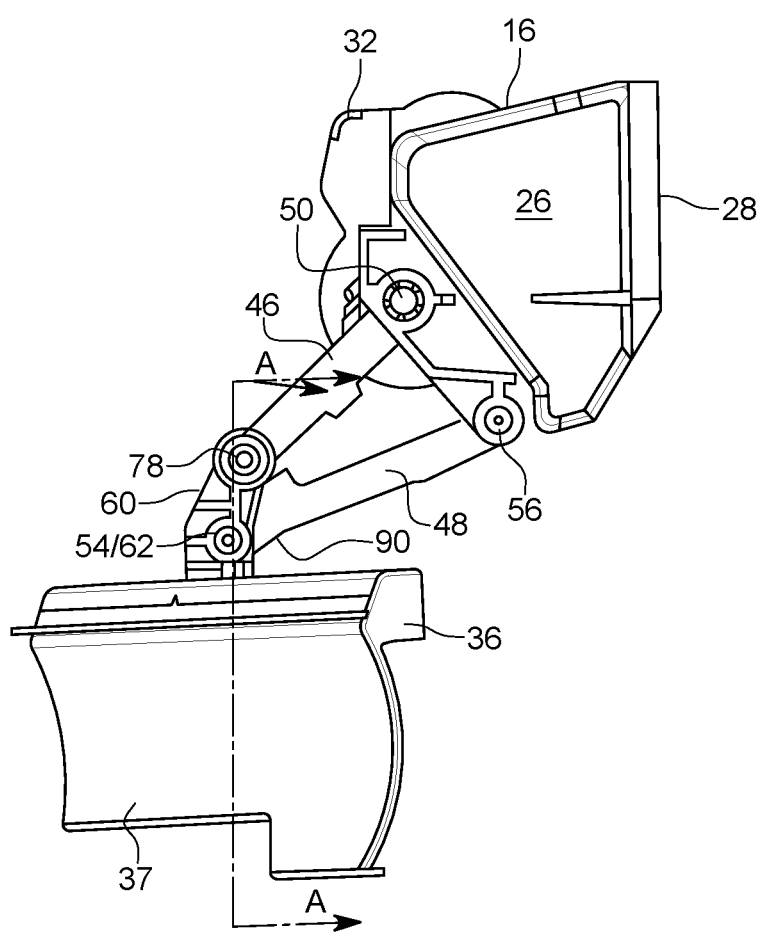
FIG. 21 is a close-up and cross-sectional view showing components of the system of the type on FIG. 11 to show elements associated with the releasable connector.
Figure 21B:
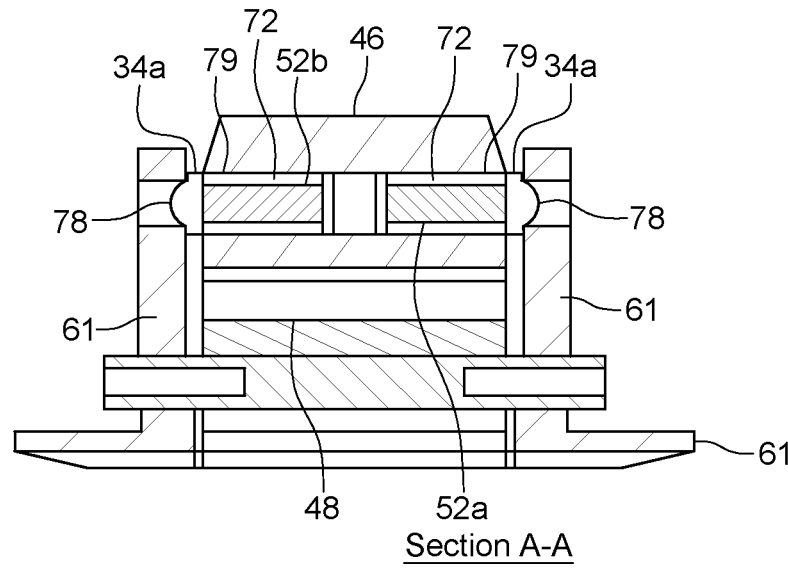
Figure 22A:
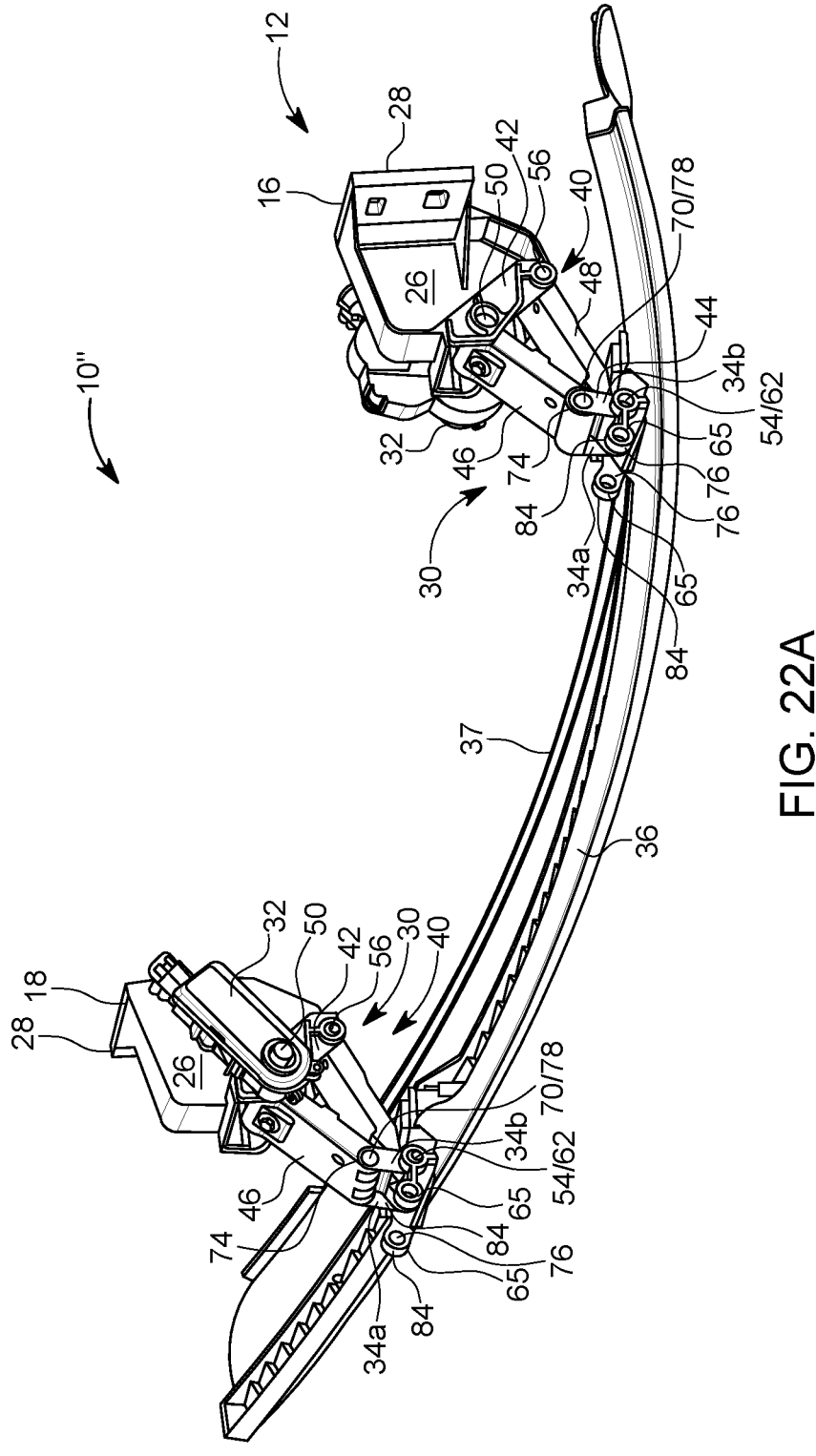
FIGS. 22a and 22b are perspective views of the system of FIG. 11 in the deployed position after release of the releasable connectors and the stored position, respectively.
Figure 22B:
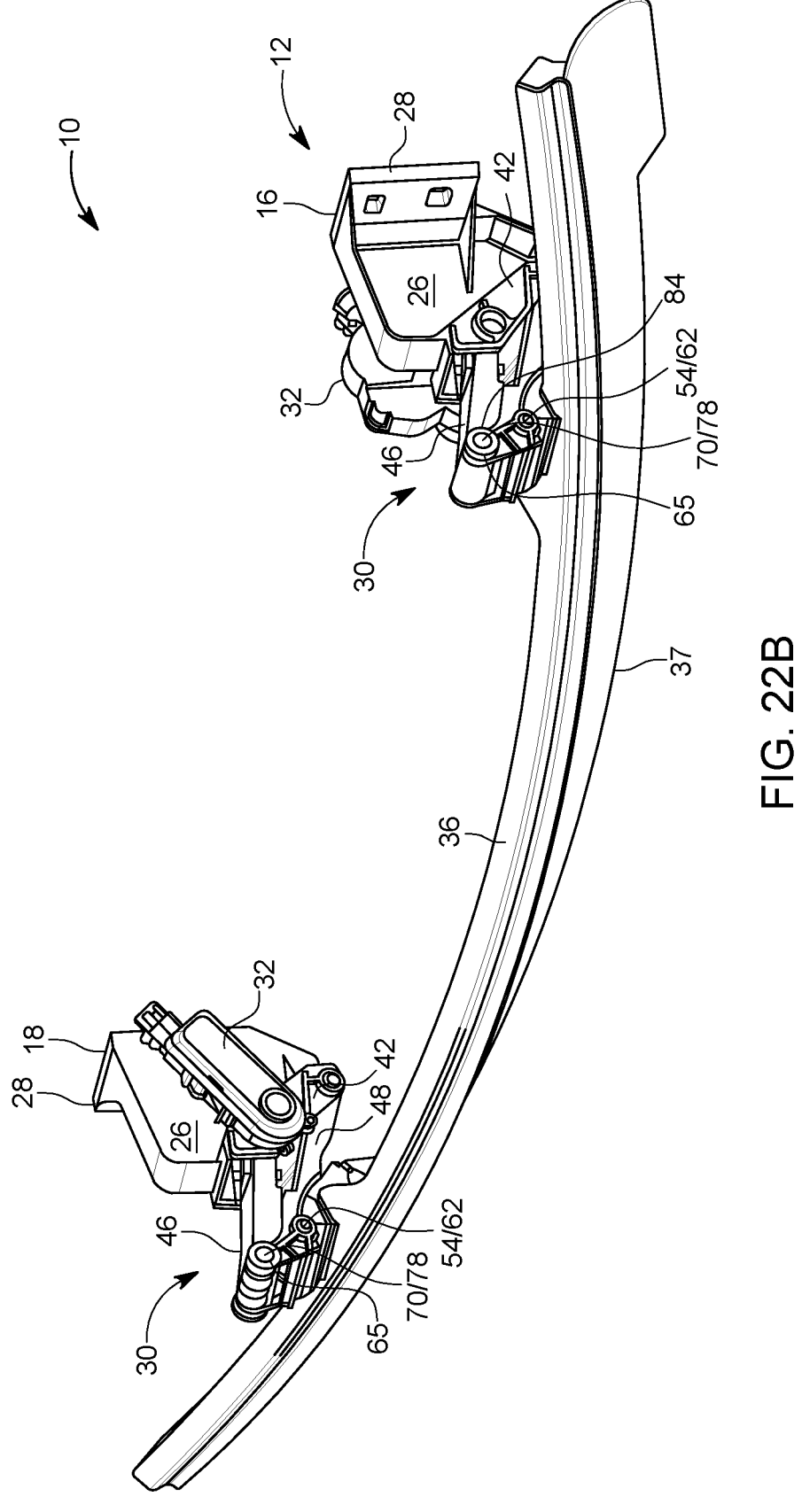

In the illustrated embodiment, when the air dam 36 strikes an object and pivots rearwardly, the furthest it can move back is to a position in which a rear surface thereof contacts a limiting surface 90, such as on the bottom surface of the lower arm 48, as best seen in FIGS. 18 and 19. In the illustrated embodiment, the rear surfaces of the air dam's attachment portions 60 makes such contact. Even if the air dam 36 does not pivot all the way rearwardly, or does pivot all the way rearwardly and is somehow pivoted slightly forwardly again, such as by rebounding immediately or due to vehicle vibrations during continued driving, that limiting surface 90 will contact the rear surface of the air dam 36 as the linkage 30 moves back to its storage position. When the air dam 36 is in contact with the limiting surface 90, even though the air dam 36 has pivoted away from the air dam mounting portion 34, the angular relationship between the air dam 36 and the lower bar 48 is the same as the angular relationship between the air dam 36 and the lower bar 48 when the linkage 30 is in its stored position and the air dam 36 is in its normal or original position connected to the air dam mounting portion 34 with the releasable connector 70 engaged. Thus, as the linkage 30 returns to its stored position, the limiting surface 90 supports the air dam 36 for return to its original or normal position with respect to the air dam mounting portion 34. That is, the air dam 36 and the linkage 30 are configured such that the air dam mounting portion 34 and the air dam 36 pivot relatively toward one another as the linkage 30 is moved back to the stored position after the air dam has pivoted rearwardly about the pivotal connector 62. This can be appreciated from FIG. 14 showing that relationship when the air dam 36 is pivoted back, FIG. 15 showing the maintenance of that relationship as the linkages are returned to the stored position, and FIG. 8 showing the stored position. As can be seen in the Figures, a substantial amount of that relative movement is attributable to the air dam mounting portion 34 pivoting forwardly about connector 54 as the linkage 30 reaches the stored position, although some may be attributable to the air dam 36 pivoting based on the change in angle of the limiting surface 90.

The movement of the air dam mounting portion 34 and air dam 36 relatively towards one another during that returning movement forces each selectively releasable connector 70 against its bias to its disengaged position and each selectively releasable connector 70 thereafter returns to its engaged position to reestablish the selectively operable connector's 70 connection of the air dam 36 to the air dam mounting portion 34. Specifically, as the air dam's attachment portion 60 and the air dam mounting portion 34 move back towards one another, sufficient force is applied to cam the selectively releasable connector(s) 70 back to the disengaged position, with subsequent return to the engaged position in the openings 65 securing the air dam 36 its original or normal relationship relative to the air dam mounting portion 34. Thus, the configuration of the air dam 36 and linkage 30 may be described as automatically resetting the system 10' to its original state with the air dam 36 in its normal position connected in its fixed relationship.

Another approach is to include a biasing structure positioned to bias the air dam 36 forwardly about the pivotal connector 62, which is configured to enable the air dam 36 to pivot rearwardly in response to a force applied thereto. This biasing structure enables the air dam 36 when striking an object in the active position thereof to pivot rearwardly about the pivotal connector and return pivoting forwardly thereafter. The forward biasing of the biasing structure will return the air dam 36 in the forwardly pivoting direction to reestablish the selectively operable connector's 70 connection in the engaged position thereof securing the air dam 36 to the air dam mounting portion 34. The action of the selectively operable connector 70 as the air dam 36 returns to its original or normal position is the same as discussed above, and the only difference with the use of the biasing structure is that the return force is applied by the biasing structure rather than manually or by the geometry/mechanics of the linkage 30 and air dam 36. This biasing structure may have any construction or configuration, and may include the torsion spring discussed in the embodiment below, or any other spring or other form of biasing structure.

In another related approach, the biasing structure can be used in a design where the geometry/mechanics of the linkage 30 and air dam 36 are used to return the air dam 36 to the normal or original position with respect to the air dam mounting portion 34. In such a design, the forward biasing of the biasing structure assists in returning the air dam 36 pivoting forwardly to reestablish the selectively operable connector's 70 connection in the engaged position between the air dam 36 and the air dam mounting portion 34. That is, the biasing structure provides assistance in addition or complementary to the geometry/mechanics. This may be desirable to compensate for any play that develops in the linkage over time, or for any other reason.

FIGS. 23-29 show another embodiment of an active air dam system 10''. Again, the same reference numbers will be used for common structures between the embodiments, and additional reference numbers will be used for differing structures. The reference number 10'' is used for convenience to denote the system 10'' separately from the other embodiments. In this embodiment, a biasing structure 92 is positioned to bias the air dam forwardly about the pivotal connector 62, and is configured to enable the air dam 36 to pivot rearwardly in response to a force applied thereto. This enables the air dam 36 when striking an object in the active position thereof to pivot rearwardly about the pivotal connector 62 and return pivoting forwardly thereafter. This embodiment with the biasing structure 92 may be practiced without a selectively releasable connector 64, 70 in the embodiments discussed above. By having the biasing structure positioned to bias the air dam 36 about the pivotal connector 62, the force applied thereto can be quickly transferred to the biasing structure 92 and absorbed thereby, thus limiting the amount of force transferred to the linkage 30.

In the illustrated embodiment, the biasing structure 92 is a spring. It can be a spring of any type, such as a torsion spring, leaf spring, or coil spring. A gas or fluid spring (e.g., a gas or fluid damper) could also be used if desired. However, a spring made of resilient material if preferred for cost and simplicity purposes. In the illustrated embodiment, the spring is a torsion spring positioned between the air dam mounting portion 34 and the air dam 36. Specifically, the torsion spring has a leg 94 engaged against the air dam 36 to bias the air dam 36 forwardly. The body of the torsion spring, i.e., the coiled portion thereof, is wound about the pivot pin 54 that connects the air dam mounting portion 34 and the lower bar 48. The torsion spring approach is advantageous because of its ability to generate sufficient force while maintaining a compact size. The location of the torsion spring on the pivot pin 54 takes up little to no additional space, and thus does not add to the overall packaging size of the system 10'' in the vehicle. The torsion spring 94 may also be installed or designed such that its force in the returning direction is decreases as the air dam 36 is pivoted rearwardly, and thus it applies a higher or maximum biasing force to the air dam in its normal position. In some embodiments, torsion springs can have an essential constant restoration force over the range of motion. This is in contrast to a linear compression spring, in which the restoration force increases with deflection, i.e., it increases as the air dam is pivoted rearwardly, thus providing a higher or maximum biasing force at the air dam's rearwardmost position.

Figure 23:
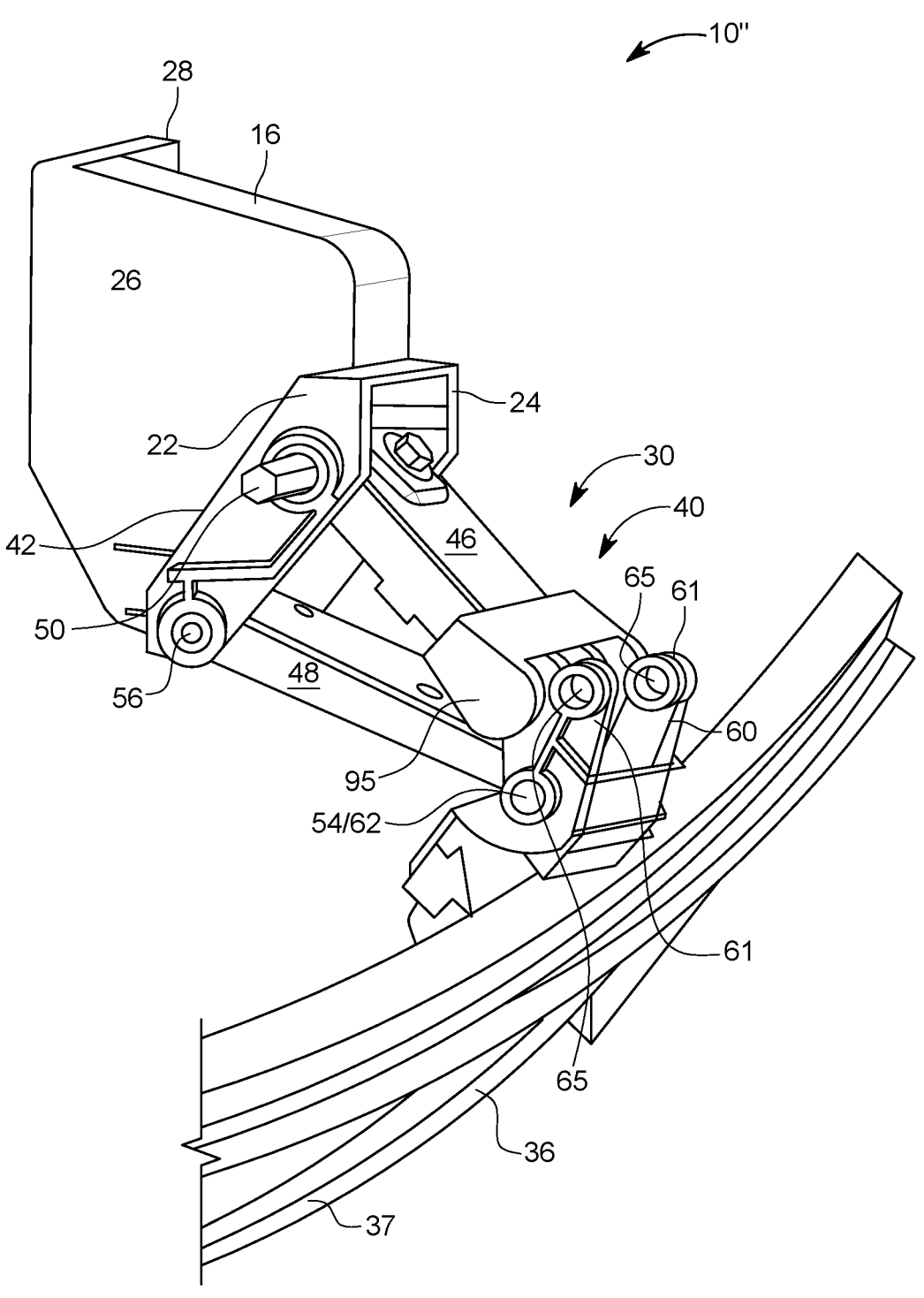
FIG. 23 is a close-up perspective view of an air dam system in accordance with yet another embodiment of the invention.
Figure 24:
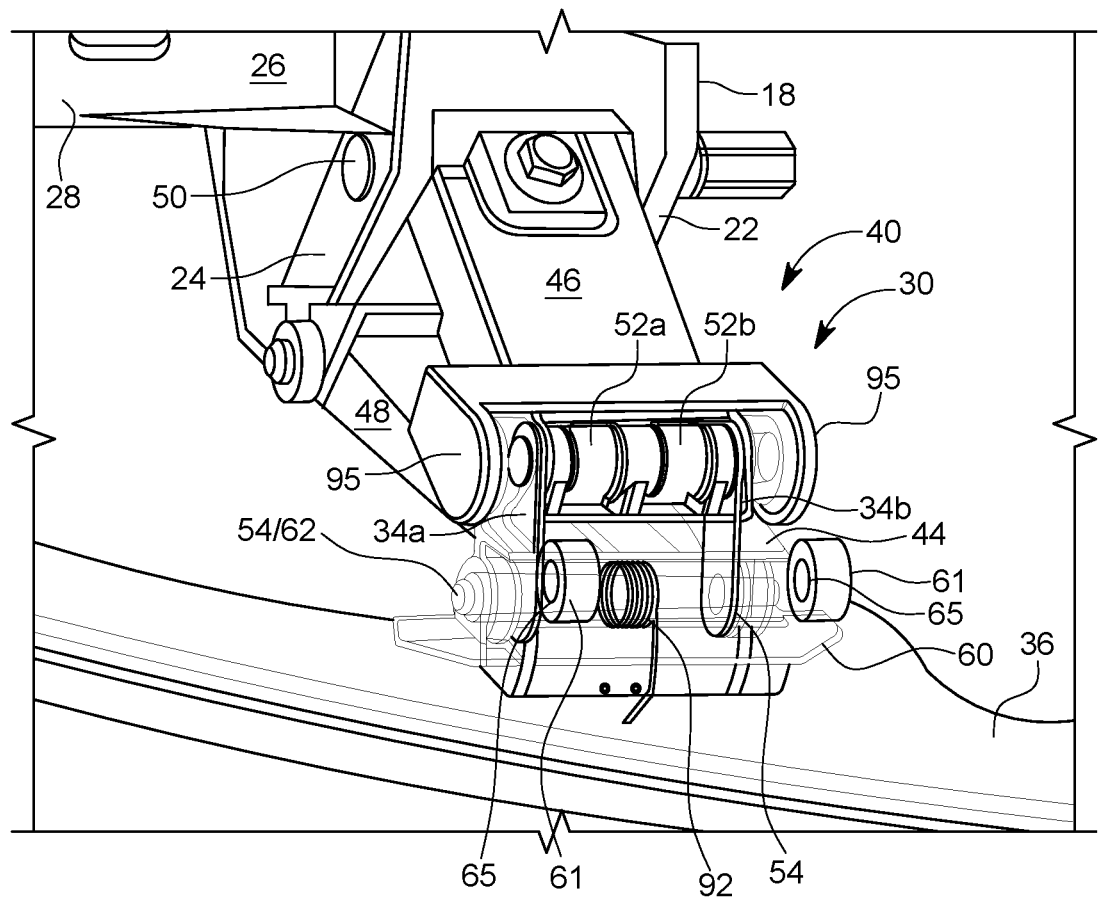
FIG. 24 is a close-up perspective view of the air dam system of FIG. 23 in the deployed position with the air dam pivoting rearwardly after impact with an object.
Figure 25:
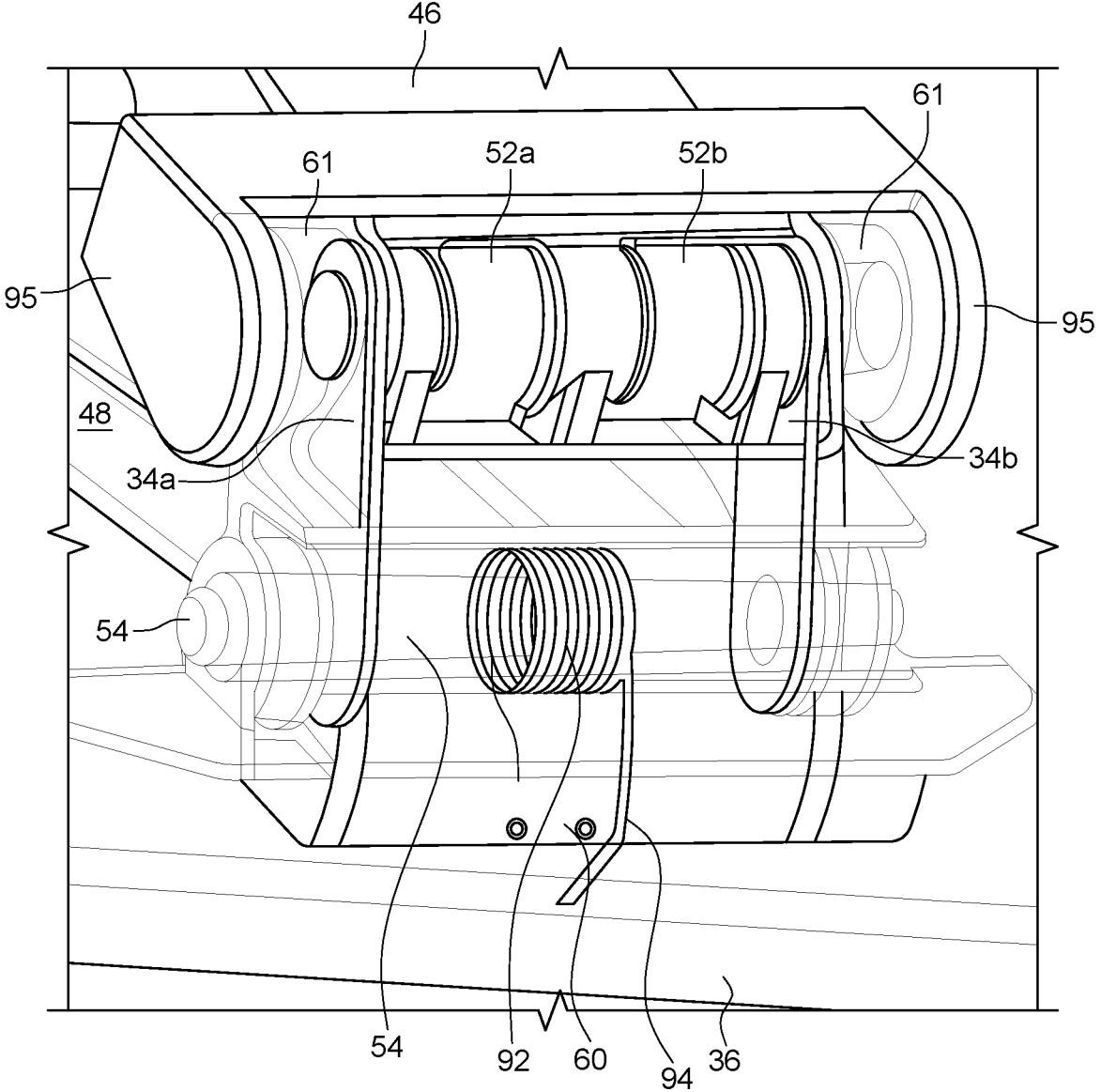
FIG. 25 is a close-up perspective view of the air dam system of FIG. 23 with some components in transparent.
Figure 26:
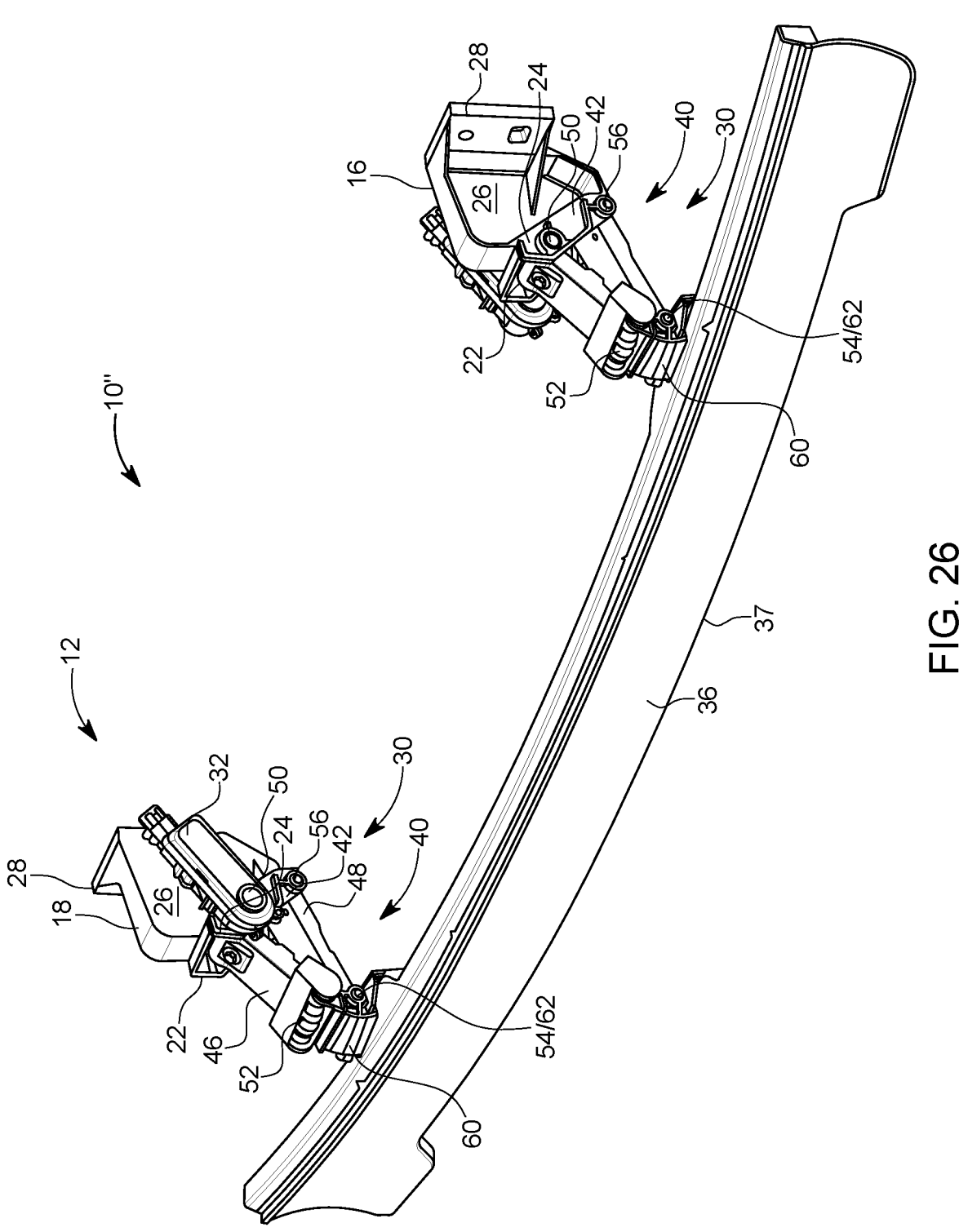
FIG. 26 is a perspective view of the air dam system of FIG. 23 in the deployed position.
Figure 27:
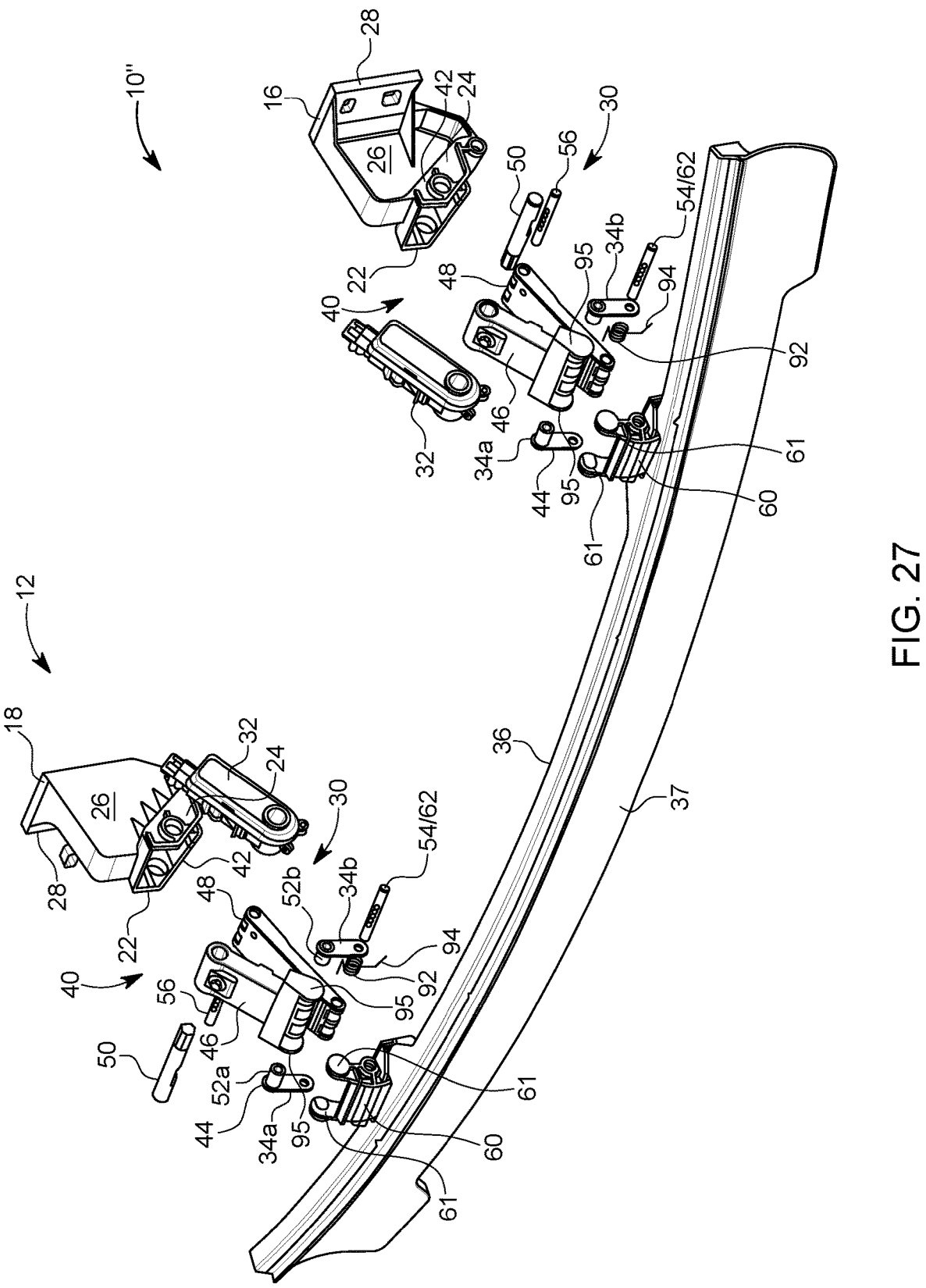
FIG. 27 is an exploded view of the air dam system of FIG. 23.
Figure 28A:
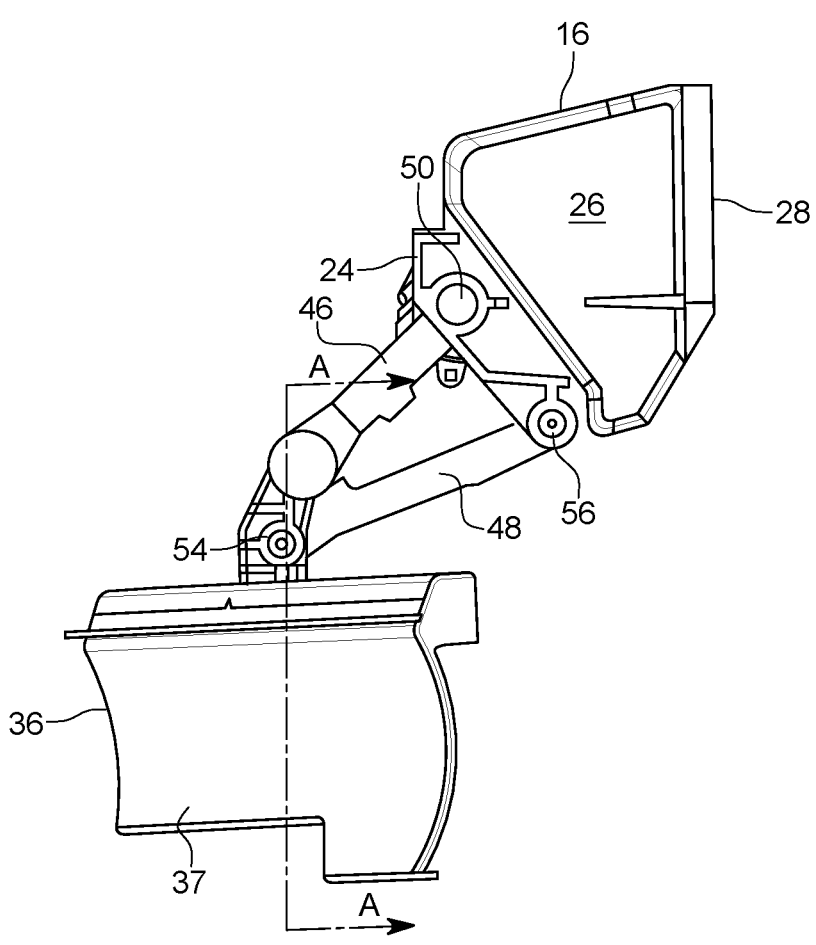
FIG. 28 is a close-up and cross-sectional view showing components of the system of the type on FIG. 23.
Figure 28B:
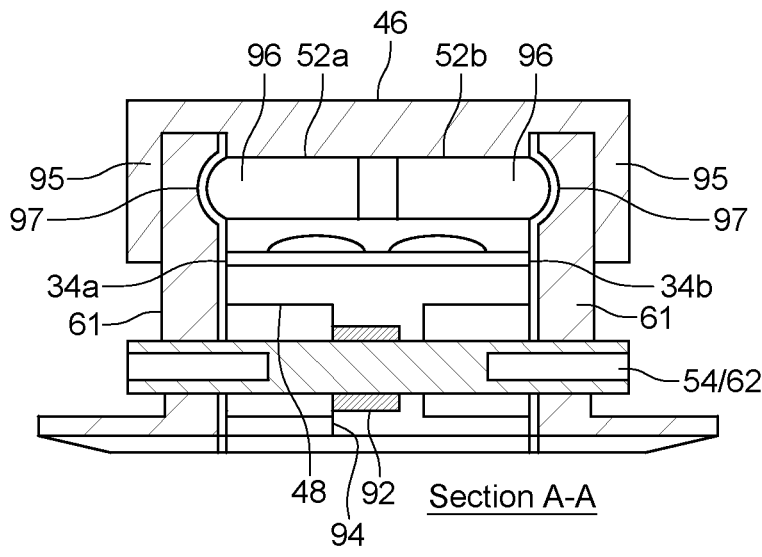
Figure 29A:
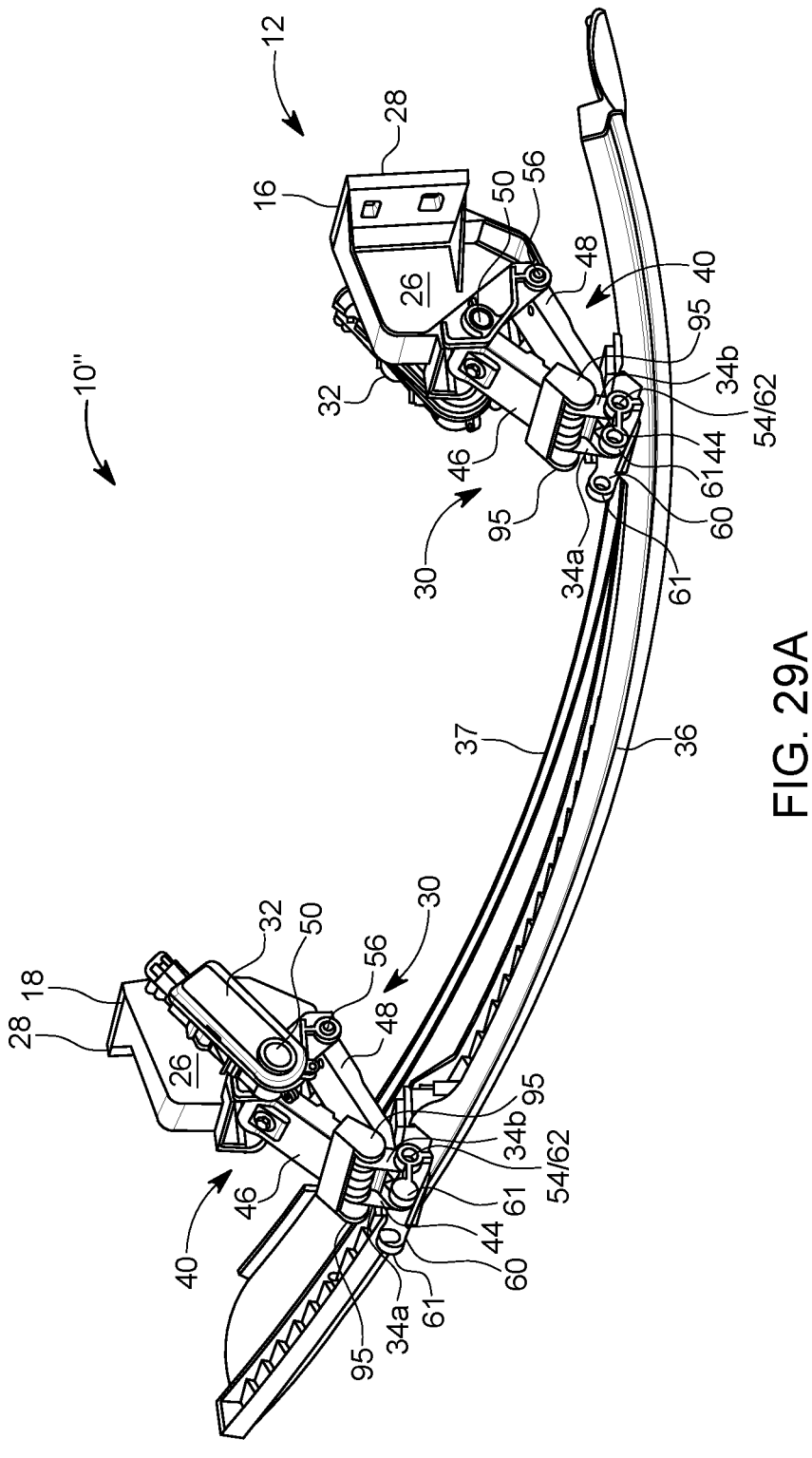
FIGS. 29a and 29b are perspective views of the system of FIG. 23 in the deployed position after rearward pivoting of the air dam and the stored position, respectively
Figure 29B:
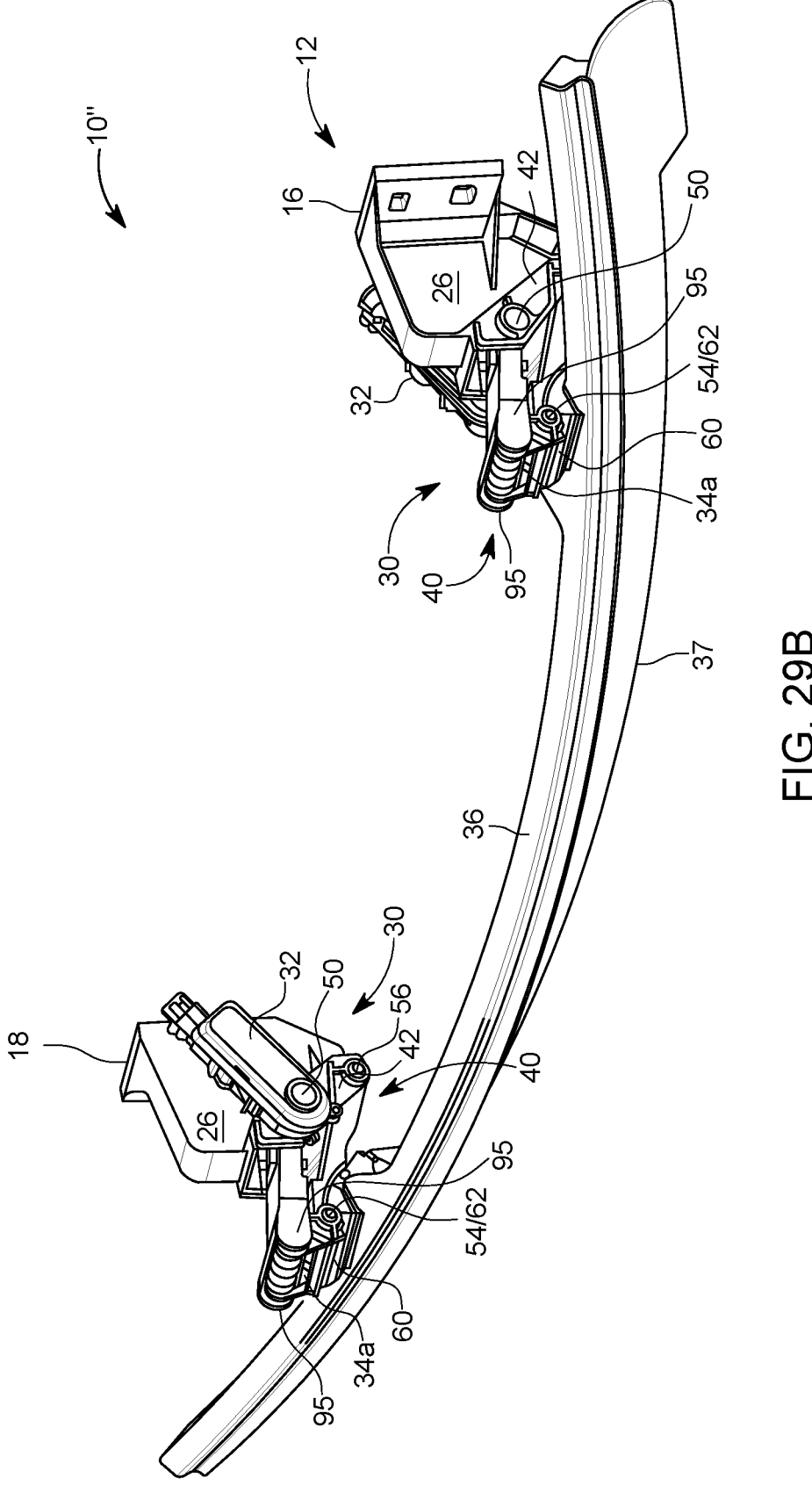

In the illustrated embodiment, the design is shown in FIGS. 23-25 as having the upward extensions 61 of the attachment portion 60 on the air dam 36 with the openings 65 that receive the selectively releasable connectors 64, 70 in the previous embodiment. FIGS. 26-29 show the same extensions without the through openings 65. In designs where the selectively releasable connectors are omitted, those upward extensions 61 may also be omitted. In designs where the selectively releasable connectors are used, those upward extensions may be retained. In some embodiments, those upward extensions 61 may be retained and be used to provide a detent engagement. A detent engagement may be beneficial for assisting in retention of the air dam 36 in its normal position relative to the air dam mounting portion 34 and limit movements due to vibrations, air flow against the air dam acting against the spring 90 or the like. A detent may be provided on the inner surface of walls 95 on the upper arm 46, which may engage a corresponding feature on the upward extension. Alternatively, a detent may be provided on outer surfaces of the air dam mounting portion 34, or may be provided by the end of a pin pivotally connecting the air dam mounting portion 34 and the upper arm 46. FIG. 28 show a detent 96 provided by a raised surface on the outer end of pin 52a and 52b (which may also be a single pin, or may be surfaces on the air dam mounting portion 34) that releasably engage slight or shallow recesses 97 for retention purposes. The location of the detent is not limiting, and any location that cooperates with corresponding features on the air dam's attachment portion 60 may be used. Alternatively, the detents may be on one or both of the upper extensions 61, and the openings (including recesses) for cooperating with the detents may be provided on the either the air dam mounting portion 34 or the upper arm 46. In place of a detent engagement, other retentions such as latch features that slide over one another may be used for such releasable securement. The detent or other form of retention may also be considered as a selectively releasable connector as well.

Figure 30:
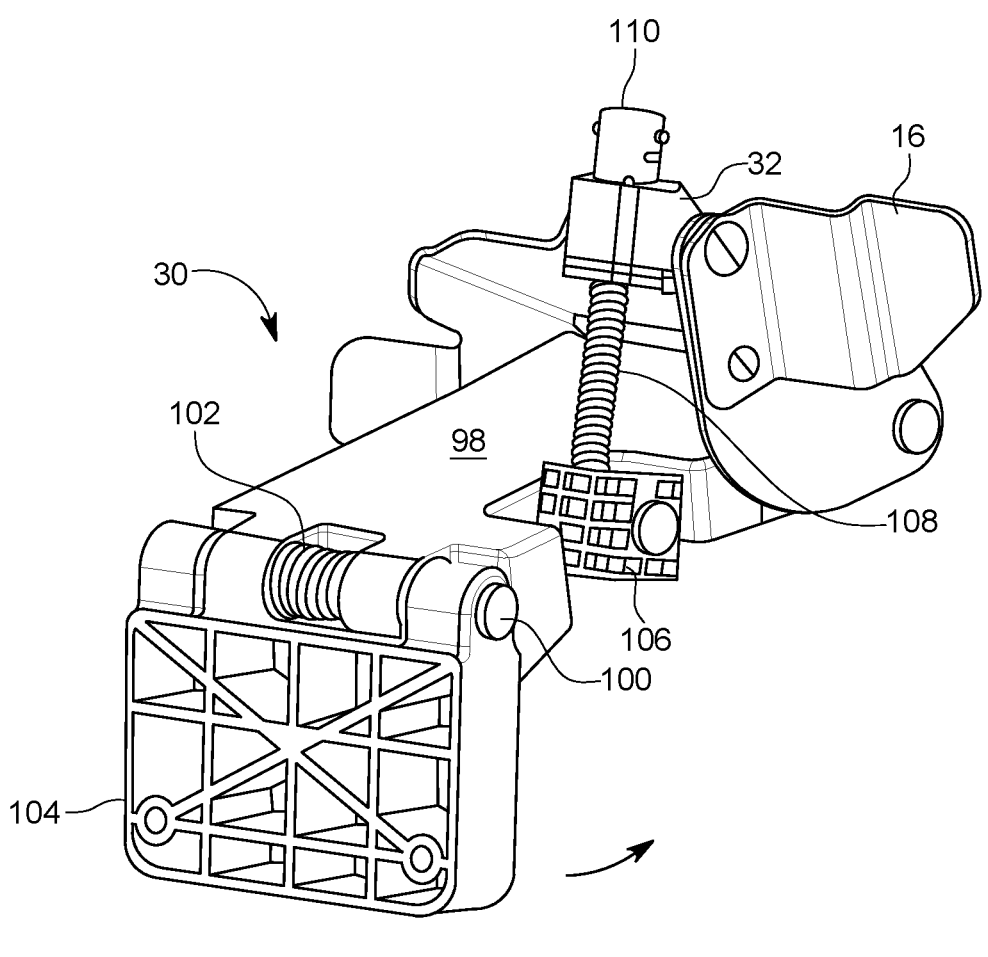
FIG. 30 is a perspective view of an air dam system in accordance with still yet another embodiment of the invention.

FIG. 30 shows an embodiment similar to that of FIGS. 23-29. In FIG. 30, the linkage 30 is formed by a single arm 98 extending between a bracket 16 and an air dam attachment portion 104. The air dam attachment portion 104 is pivotally connected to the arm 98 by a pin 100. The pin 100 has a torsion or other types of spring 102 that bias the air dam mounting portion 104 forwardly to bias the air dam (not shown) forwardly. The arm 98 is moved between its stored and deployed positions by a driver 32, here shown as a motor 110 for operating a screw drive 106. The screw drive 106 is driven by a flexible rotary cable 108 driven by the motor 110 to raise and lower the arm 98. The flexibility of the cable 108 enables changes of orientation with ease, although it is optional and any other mechanism for driving the arm 98 may be used.

In the design of FIG. 30, the air dam mounting portion 104 and the air dam can be mounted directly to the arm 98, such as by the pin 100 with the end of the arm 98 being the air dam mounting portion 104. In that design, the spring 102 will engage the air dam directly.

The foregoing embodiments have been provided solely for understanding the structural and functional principles of the present invention by way of example, and are not intended to be limiting. To the contrary, the present invention encompasses all modifications, alterations, substitutions, and equivalents within the spirt and scope of the appended claims.

What is claimed:

1. An active air dam system for mounting beneath a vehicle, the system comprising:
- a mounting bracket for mounting the system beneath the vehicle;
- a linkage mounted to the mounting bracket and having an air dam mounting portion at a distal end thereof;
- an air dam mounted to the air dam mounting portion of the linkage;
- the linkage being moveable between (a) a stored position for raising the air dam upwardly towards the mounting bracket to a retracted position, and (b) a deployed position for lowering the air dam away from the mounting bracket to an active position to extend downwardly from the vehicle for deflecting air;
- a driver connected to the linkage for moving the linkage under power between the stored and deployed positions;
- the air dam being connected to the air dam mounting portion of the linkage by a pivotal connector and a selectively releaseable connector, the pivotal connector and the selectively releaseable connector cooperating to maintain a fixed relationship between the air dam and the air dam mounting portion;
- the selectively releaseable connector being configured to release its connection of the air dam and the air dam mounting portion in response to a force exceeding a threshold amount being applied thereto by the air dam pivoting rearwardly relative to the air dam mounting portion about the pivotal connector, thus enabling the air dam when striking an object in the active position thereof to pivot rearwardly about the pivotal connector.

2. The active air dam system of claim 1, wherein the selectively releaseable connector is a frangible connector and the force exceeding the threshold amount is a force that breaks the frangible connector to release its connection to the air dam.

3. The active air dam system of claim 2, wherein the air dam has a release pin receiving aperture and the air dam mounting portion of the linkage has a release pin receiving aperture, and wherein the frangible connector is a frangible release pin received in both said receiving apertures,
- wherein the frangible release pin is configured such that the force that breaks the frangible release pin is a force that shears the release pin by pivoting of the air dam to move the release pin receiving aperture thereof relative to the release pin receiving aperture of the air dam mounting portion.

4. The active air dam system of claim 1, wherein the selectively releasable connector moves between (a) an engaged position connecting the air dam to the air dam mounting portion for cooperating with the pivotal connector to maintain the fixed relationship between the air dam and the air dam mounting portion and (b) a disengaged position to release its connection of the air dam to the air dam mounting portion in response to the force exceeding the threshold amount being applied thereto by the air dam.

5. The active air dam system of claim 4, wherein the selectively releasable connector is biased to the engaged position, and the force exceeding the threshold amount to move the selectively releasable connector to the disengaged position is a force that overcomes the biasing to the engaged position.

6. The active air dam system of claim 5, further comprising a spring for biasing the selectively releasable connector to the engaged position.

7. The active air dam system according to claim 5, wherein the selectively releasable connector is mounted to one of the air dam mounting portion and the air dam,
- wherein the selectively releasable connector and the other of the air dam mounting portion and the air dam each have camming surfaces for engaging with one another in the engaged position of the selectively releasable connector, and
- wherein the camming surfaces are configured to cam against one another to apply the force exceeding the threshold amount to move the selectively releasable connector to the disengaged position by the air dam pivoting rearwardly relative to the air dam mounting portion about the pivotal connector.

8. The active air dam system according to claim 7, wherein the selectively releasable connector is a pin slidably mounted to the one of the air dam mounting portion and the air dam with an end of the pin providing the camming surface thereof, and the other of the air dam mounting portion and the air dam has a pin receiving opening providing the camming surface thereof and receiving the end of the pin.

9. The active air dam system according to claim 8, wherein the pin is slidably mounted to the air dam mounting portion and the pin receiving opening is provided on the air dam.

10. The active air dam system according to claim 4, wherein the air dam and the linkage are configured to reestablish the selectively operable connector's connection in the engaged position thereof of the air dam to the air dam mounting portion as a result of the linkage being moved back to the stored position after the air dam has pivoted rearwardly about the pivotal connector.

11. The active air dam according to claim 10, wherein the selectively releasable connector is biased to the engaged position, and the force exceeding the threshold amount to move the selectively releasable connector to the disengaged position is a force that overcomes the biasing to the engaged position;
- wherein the air dam and the linkage are configured such that the air dam mounting portion and the air dam pivot relatively toward one another as the linkage is moved back to the stored position after the air dam has pivoted rearwardly about the pivotal connector, wherein the movement of the air dam mounting portion and air dam relatively towards one another forces the selectively releasable connector against its bias to its disengaged position and the selectively releasable connector thereafter returns to its engaged position to reestablish the selectively operable connector's connection of the air dam to the air dam mounting portion.

12. The active air dam system of claim 11, further comprising a spring for biasing the selectively releasable connector to the engaged position.

13. The active air dam system according to claim 11, wherein the selectively releasable connector is mounted to one of the air dam mounting portion and the air dam, wherein the selectively releasable connector and the other of the air dam mounting portion and the air dam each have camming surfaces for engaging with one another in the engaged position of the selectively releasable connector, and wherein the camming surfaces are configured to cam against one another to apply the force exceeding the threshold amount to move the selectively releasable connector to the disengaged position by the air dam pivoting rearwardly relative to the air dam mounting portion about the pivotal connector;

wherein the other of the air dam mounting portion and the air dam has a return stroke camming surface configured to cam against the camming surface of the selectively releasable connector to apply the force exceeding the threshold amount to move the selectively releasable connector to the disengaged position by the air dam mounting portion and the air dam pivoting relatively toward one another as the linkage is moved back to the stored position after the air dam has pivoted rearwardly about the pivotal connector.

14. The active air dam system according to claim 13, wherein the selectively releasable connector is a pin slidably mounted to the one of the air dam mounting portion and the air dam with an end of the pin providing the camming surface thereof, and the other of the air dam mounting portion and the air dam has a pin receiving opening providing the camming surface thereof and receiving the end of the pin, the other of the air dam mounting portion and the air dam also having an edge providing the return camming surface thereof.

15. The active air dam system according to claim 14, wherein the pin is slidably mounted to the air dam mounting portion and the pin receiving opening and the edge are provided on the air dam.

16. The active air dam according to claim 4, further comprising a biasing structure positioned to bias the air dam forwardly about the pivotal connector, and being configured to enable the air dam to pivot rearwardly in response to a force applied thereto, thus enabling the air dam when striking an object in the active position thereof to pivot rearwardly about the pivotal connector and return pivoting forwardly thereafter, wherein the forward biasing of the biasing structure returns the air dam pivoting forwardly to reestablish the selectively operable connector's connection in the engaged position thereof of the air dam to the air dam mounting portion after the air dam has pivoted rearwardly about the pivotal connector.

17. The active air dam according to claim 16, wherein the selectively releasable connector is biased to the engaged position, and the force exceeding the threshold amount to move the selectively releasable connector to the disengaged position is a force that overcomes the biasing to the engaged position;

wherein the forward biasing of the biasing structure returns the air dam pivoting forwardly such that the air dam mounting portion and the air dam pivot relatively toward one another after the air dam has pivoted rearwardly about the pivotal connector, wherein the movement of the air dam mounting portion and air dam relatively towards one another forces the selectively releasable connector against its bias to its disengaged position and the selectively releasable connector thereafter returns to its engaged position to reestablish the selectively operable connector's connection of the air dam to the air dam mounting portion.

18. The active air dam system of claim 17, further comprising a spring for biasing the selectively releasable connector to the engaged position.

19. The active air dam system according to claim 17, wherein the selectively releasable connector is mounted to one of the air dam mounting portion and the air dam, wherein the selectively releasable connector and the other of the air dam mounting portion and the air dam each have camming surfaces for engaging with one another in the engaged position of the selectively releasable connector, and wherein the camming surfaces are configured to cam against one another to apply the force exceeding the threshold amount to move the selectively releasable connector to the disengaged position by the air dam pivoting rearwardly relative to the air dam mounting portion about the pivotal connector;

wherein the other of the air dam mounting portion and the air dam has a return stroke camming surface configured to cam against the camming surface of the selectively releasable connector to apply the force exceeding the threshold amount to move the selectively releasable connector to the disengaged position by the air dam mounting portion and the air dam pivoting relatively toward one another as the linkage is moved back to the stored position after the air dam has pivoted rearwardly about the pivotal connector.

20. The active air dam system according to claim 17, wherein the selectively releasable connector is a pin slidably mounted to the one of the air dam mounting portion and the air dam with an end of the pin providing the camming surface thereof, and the other of the air dam mounting portion and the air dam has a pin receiving opening providing the camming surface thereof and receiving the end of the pin, the other of the air dam mounting portion and the air dam also having an edge providing the return camming surface thereof.

21. The active air dam system according to claim 20, wherein the pin is slidably mounted to the air dam mounting portion and the pin receiving opening and the edge are provided on the air dam.

22. The active air dam according to claim 10, further comprising a biasing structure positioned to bias the air dam forwardly about the pivotal connector, and being configured to enable the air dam to pivot rearwardly in response to a force applied thereto, thus enabling the air dam when striking an object in the active position thereof to pivot rearwardly about the pivotal connector and return pivoting forwardly thereafter, wherein the forward biasing of the biasing structure assists in returning the air dam pivoting forwardly to reestablish the selectively operable connector's connection in the engaged position thereof of the air dam to the air dam mounting portion after the air dam has pivoted rearwardly about the pivotal connector.

23. The active air dam system of claim 1, wherein the linkage is a four-bar linkage comprising one bar provided by the mounting bracket, one bar provided by the air dam mounting portion, and upper and lower bars pivotally connected between the other two bars.

24. The active air dam system of claim 1, wherein the air dam mounting portion is formed by two members each with a hollow pin extending inwardly therefrom, and wherein the selectively releasable connector is a pair of selectively releasable connectors mounted respectively in said hollow pins.

25. An active air dam system for mounting beneath a vehicle, the system comprising:

a mounting bracket for mounting the system beneath the vehicle;

a linkage mounted to the mounting bracket and having an air dam mounting portion at a distal end thereof;

an air dam mounted to the air dam mounting portion of the linkage;

the linkage being moveable between (a) a stored position for raising the air dam upwardly towards the mounting bracket to a stored position, and (b) a deployed position for lowering the air dam away from the mounting bracket to an active position to extend downwardly from the vehicle for deflecting air;

a driver connected to the linkage for moving the linkage under power between the stored and deployed positions;

the air dam being connected to the air dam mounting portion of the linkage by a pivotal connector;

a biasing structure positioned to bias the air dam forwardly about the pivotal connector, and being configured to enable the air dam to pivot rearwardly in response to a force applied thereto, thus enabling the air dam when striking an object in the active position thereof to pivot rearwardly about the pivotal connector and return pivoting forwardly thereafter.

26. The active air dam system according to claim 25, wherein the biasing structure is a spring.

27. The active air dam system according to claim 26, wherein the biasing structure is a spring formed of resilient material.

28. The active air dam system according to claim 27, wherein the spring is a torsion spring positioned between the air dam mounting portion and the air dam.

29. The active air dam system according to claim 27, wherein the torsion spring has a leg engaged against the air dam to bias the air dam forwardly.

30. The active air dam system of claim 25, wherein the linkage is a four-bar linkage comprising one bar provided by the mounting bracket, one bar provided by the air dam mounting portion, and upper and lower bars pivotally connected between the other two bars.

\* \* \* \* \*